(12) United States Patent
Ochoa et al.

(10) Patent No.: US 9,131,806 B1
(45) Date of Patent: *Sep. 15, 2015

(54) SYSTEM FOR MIXING BEVERAGES AND METHOD OF DOING THE SAME

(71) Applicant: GÜDPOD HOLDINGS, LLC, Bronxville, NY (US)

(72) Inventors: Gian-Carlo Ochoa, Bronxville, NY (US); Brendan J. Duffy, Sandy Hook, CT (US); Chris Penna, Guilford, CT (US); Gary Van Deursen, Essex, CT (US)

(73) Assignee: Gudpod Holdings, LLC, Bronxville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/592,007

(22) Filed: Jan. 8, 2015

Related U.S. Application Data

(63) Continuation of application No. 14/278,762, filed on May 15, 2014, now Pat. No. 8,960,999.

(60) Provisional application No. 61/972,020, filed on Mar. 28, 2014.

(51) Int. Cl.
*A47J 43/044* (2006.01)

(52) U.S. Cl.
CPC ...... *A47J 43/044* (2013.01); *A47J 2043/04472* (2013.01)

(58) Field of Classification Search
CPC .................. A47J 2043/04472; A47J 43/044
USPC .......... 366/347, 207, 244, 245, 246, 247, 250
See application file for complete search history.

(56) References Cited

U.S. PATENT DOCUMENTS

| 1,233,823 A | 7/1917 | Tiger |
| 1,412,401 A | 4/1922 | Gotfredsen |

(Continued)

FOREIGN PATENT DOCUMENTS

| WO | WO2013/033786 | 3/2013 |
| WO | WO2013/130576 | 9/2013 |

OTHER PUBLICATIONS

International Search Report in PCT/AU2012/001072, dated Nov. 20, 2012 (5 pages).

(Continued)

*Primary Examiner* — Tony G Soohoo
(74) *Attorney, Agent, or Firm* — Nixon Peabody LLP

(57) ABSTRACT

A beverage mixing system includes a housing, a sealing feature, a locking feature, and an agitator. The housing has an opening separating inner and outer surfaces and a boss that extends through the housing such that part of the outer surface forms an inner bore of the boss having a terminus pointing toward the opening. The agitator has a base, a shaft, and a mixing element coupled to the base such that the base, in cooperation with the sealing feature, circumferentially seals the opening of the housing to form a cavity defined by the inner surface. The shaft passes through the inner bore. The locking feature when engaged permits independent or simultaneous translational and rotational movement of the shaft while an area between the terminus of the boss and the shaft remains mechanically sealed during the movement against liquid or powder encroachment into a clean area of the inner bore.

30 Claims, 34 Drawing Sheets

(56) References Cited

U.S. PATENT DOCUMENTS

| | | |
|---|---|---|
| 1,496,611 A | 6/1924 | Siegel |
| 3,061,279 A | 10/1962 | Reed |
| 3,134,577 A | 5/1964 | Bollmeier |
| 3,240,391 A | 3/1966 | Garton |
| 3,738,619 A | 6/1973 | Shirae |
| 4,160,602 A | 7/1979 | Benz |
| 4,193,698 A | 3/1980 | Gartner |
| 4,195,730 A | 4/1980 | Hunt |
| 4,408,690 A | 10/1983 | Ferrero |
| 4,547,076 A | 10/1985 | Maurer |
| 5,328,263 A | 7/1994 | Neilson |
| 5,439,289 A | 8/1995 | Neilson |
| 5,634,714 A | 6/1997 | Guild |
| 5,766,665 A | 6/1998 | Miller |
| 6,071,006 A | 6/2000 | Hochstein |
| 6,616,323 B2 | 9/2003 | McGill |
| 6,647,863 B2 | 11/2003 | Lang |
| 6,706,300 B1 | 3/2004 | Lassota |
| 6,708,735 B1 | 3/2004 | Kenihan |
| 7,144,150 B2 | 12/2006 | Farrell |
| 7,854,104 B2 | 12/2010 | Cronin |
| 8,337,074 B2 | 12/2012 | Wild |
| 8,807,823 B2 | 8/2014 | Williams |
| 2004/0155061 A1 | 8/2004 | Roth |
| 2005/0193896 A1 | 9/2005 | McGill |
| 2008/0067172 A1 | 3/2008 | Wilhelm |
| 2008/0223741 A1 | 9/2008 | Nyambi |
| 2008/0279040 A1 | 11/2008 | Neilson |
| 2009/0065570 A1 | 3/2009 | Peters |
| 2009/0293735 A1 | 12/2009 | Van Dillen |
| 2010/0154645 A1 | 6/2010 | Nosler |
| 2010/0163509 A1 | 7/2010 | Canziani Hoffa |
| 2012/0121768 A1 | 5/2012 | Lai |

OTHER PUBLICATIONS

International Preliminary Report on Patentability and Written Opinion in PCT/AU2012/001072, dated Mar. 12, 2014 (7 pages).

International Search Report in PCT/US2013/027982, Russian Patent Office, dated Jul. 11, 2013 (2 pages).

International Search Report in PCT/US15/17142, dated Jul. 14, 2015 (6 pages).

International Written Opinion in PCT/US15/17142, dated Jul. 14, 2015 (14 pages).

FIG. 9A
FIG. 9B
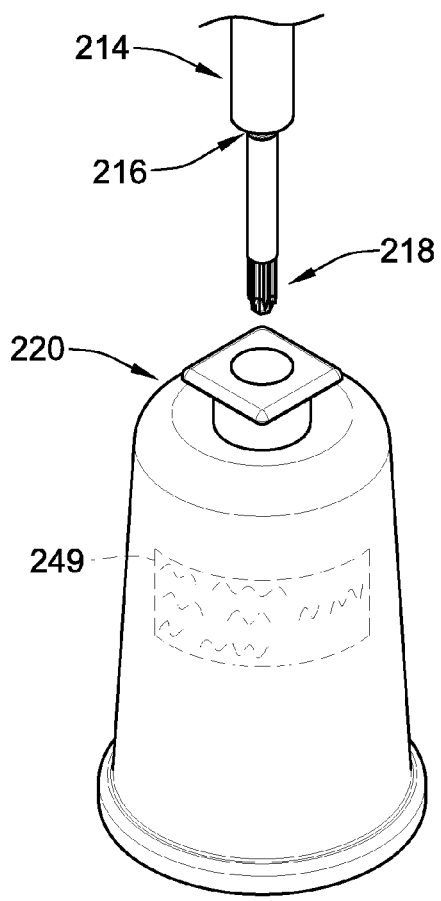
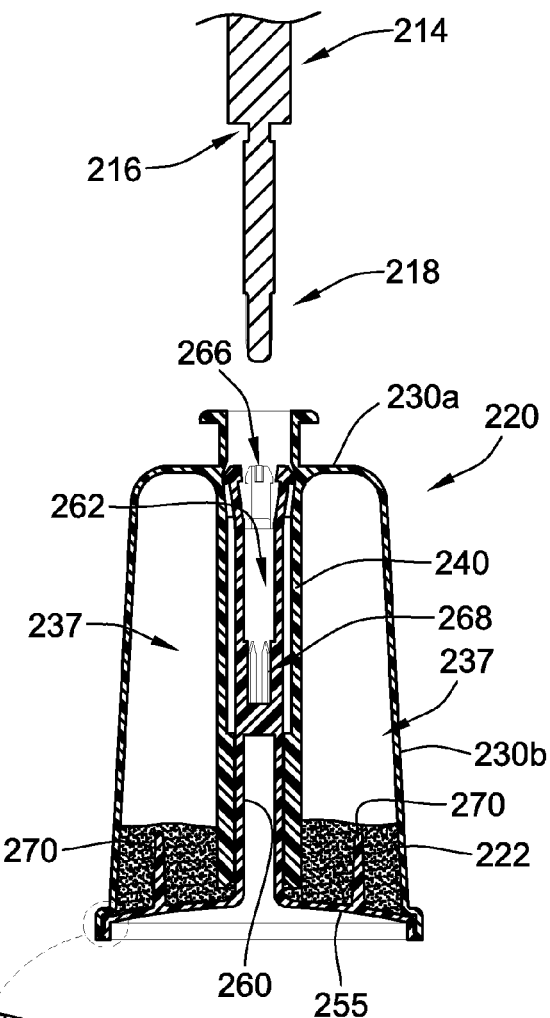

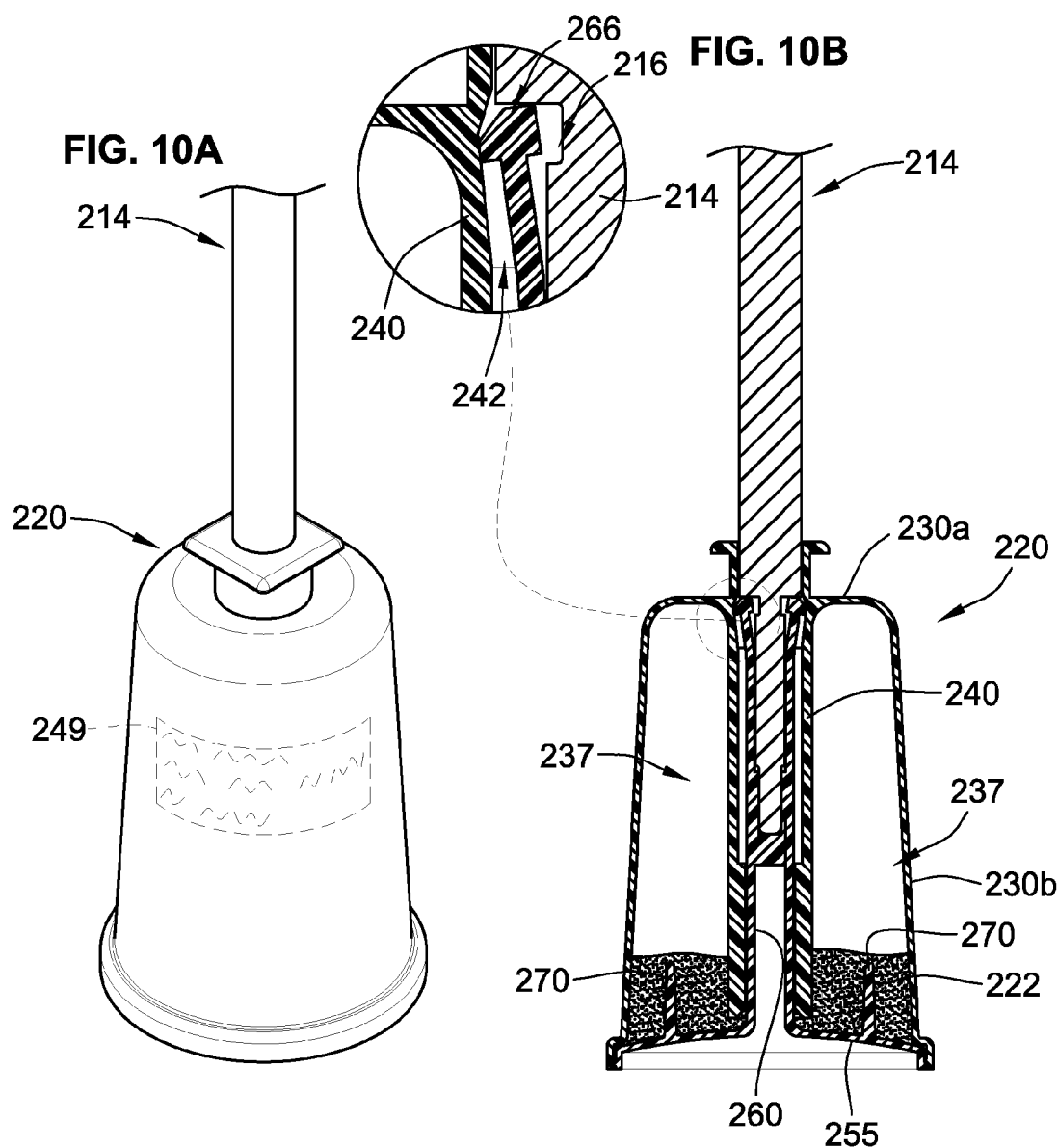

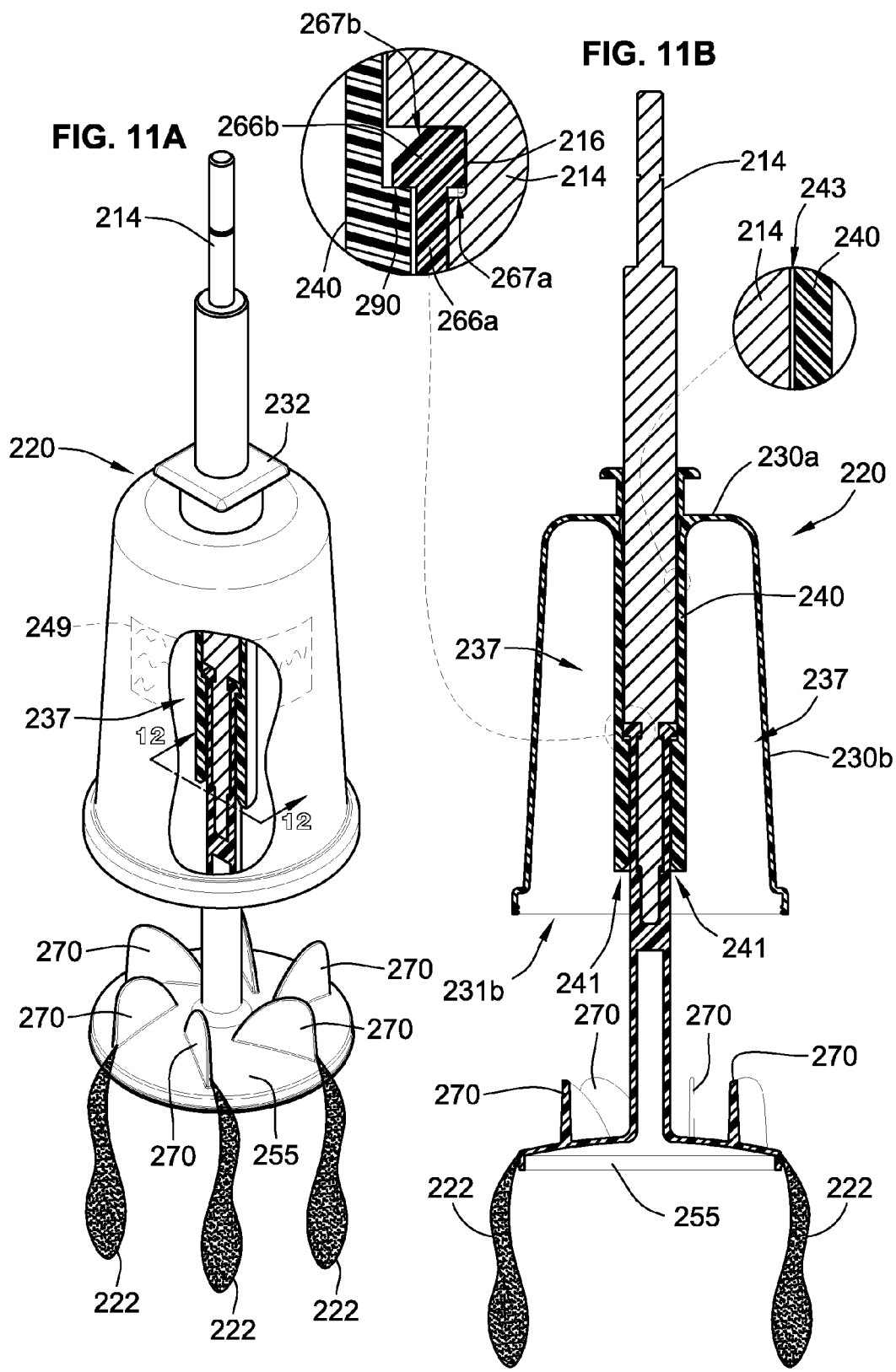

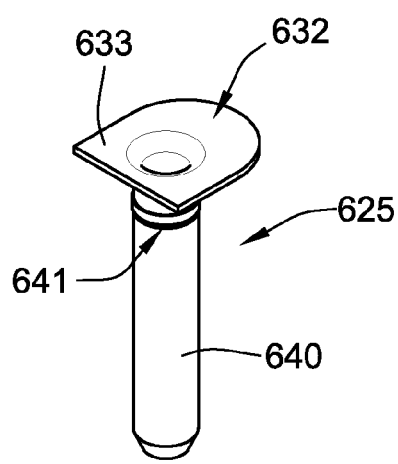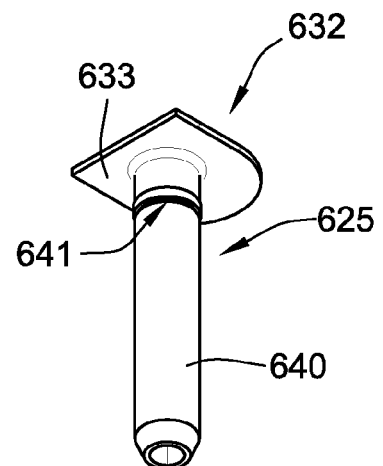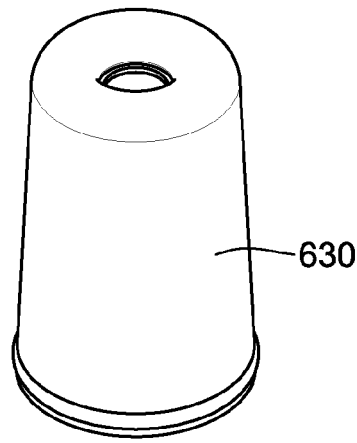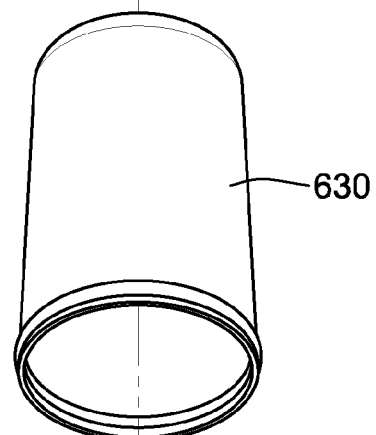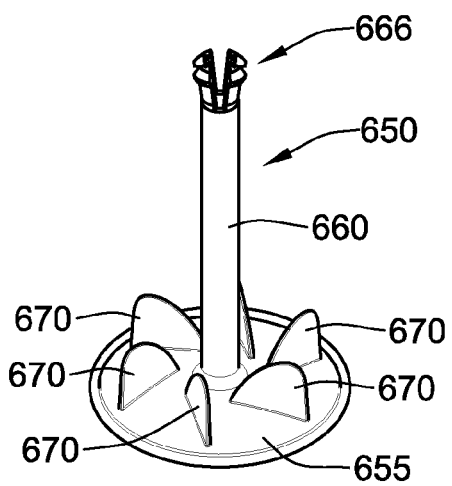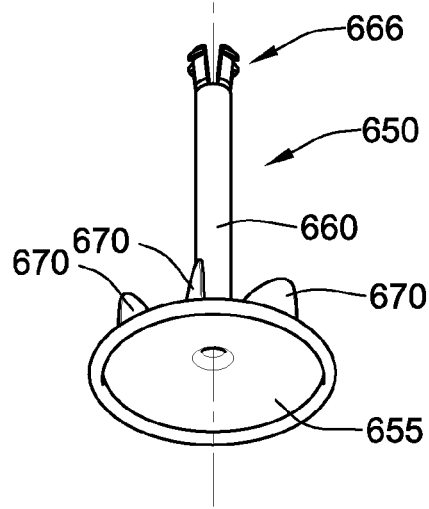
FIG. 17B          FIG. 17C

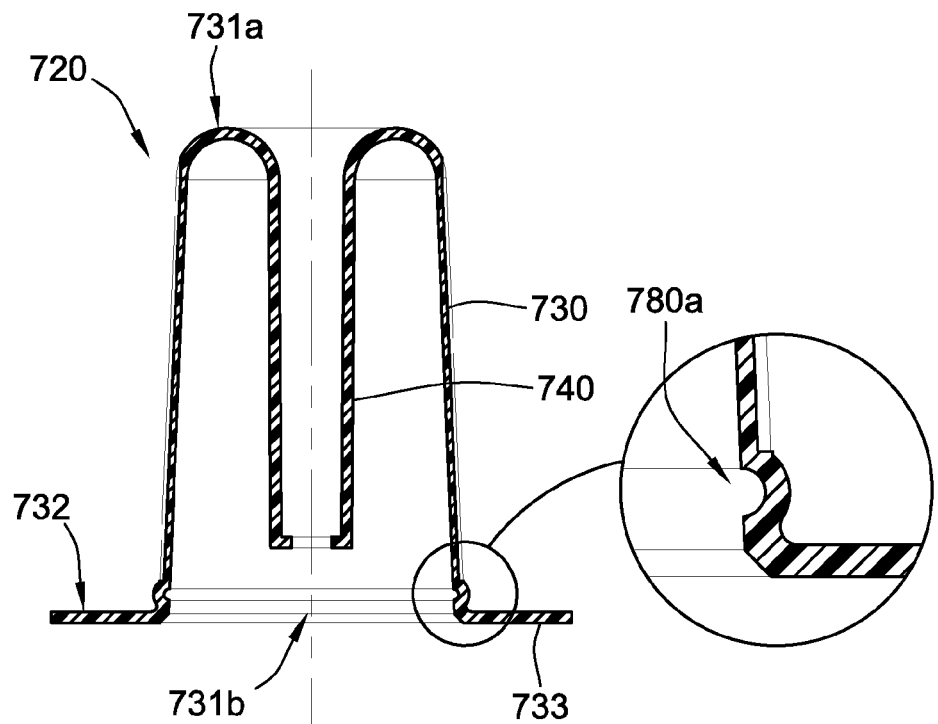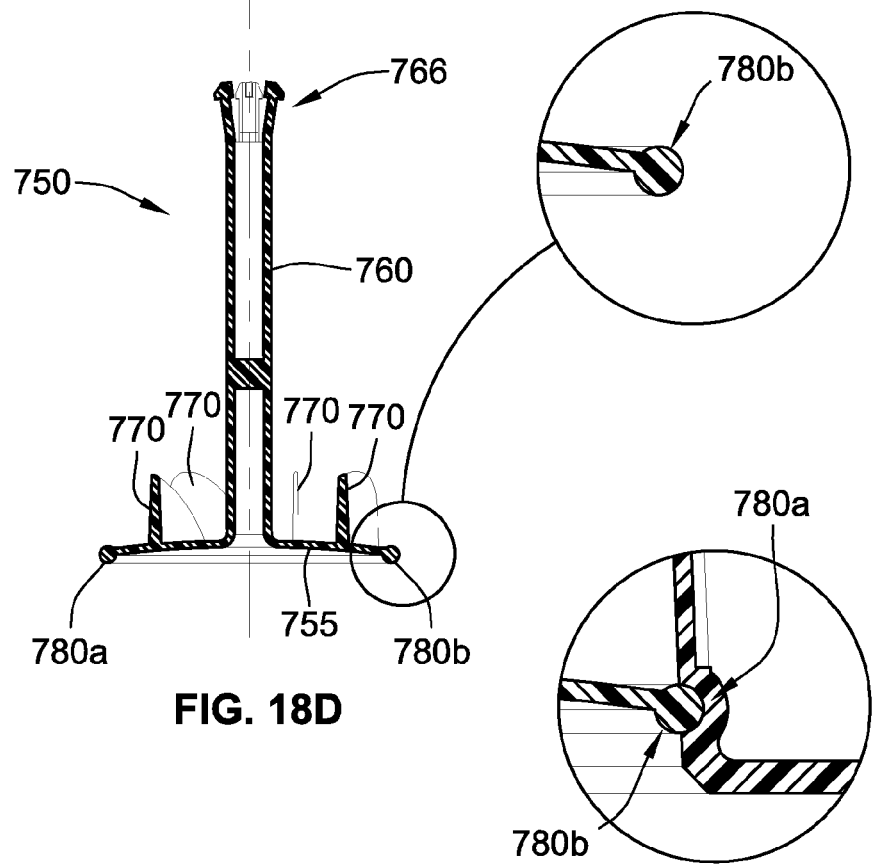
FIG. 18D
FIG. 18E

SYSTEM FOR MIXING BEVERAGES AND METHOD OF DOING THE SAME

CROSS REFERENCE TO RELATED APPLICATIONS

This application is a continuation of prior application Ser. No. 14/278,762, filed May 15, 2014, now U.S. Pat. No. 8,960,999, which claims the benefit of U.S. Provisional Application No. 61/972,020, filed Mar. 28, 2014, each of which is hereby incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present disclosure relates generally to systems for mixing beverages and, more particularly, to a system for mixing nutraceutical beverages using a compounding module having built-in mixing elements and storing nutraceutical-beverage material to be mixed therein.

BACKGROUND

Known beverage mixing systems exist for mixing, for example, water with powder. One example of such a known beverage mixing system is a blender. When using a blender to mix beverages, typically, the blending container and blade therein is washed/rinsed between drinks Another example of a known beverage mixing system uses a plastic pod with beverage material to be mixed therein and passes a stream of hot water through the pod and out an aperture created in the bottom of the pod, thereby mixing the beverage. With respect to certain nutraceutical beverages, these known beverage mixing systems, and others, have significant drawbacks. Specifically, because some nutraceutical beverages can include pharmaceuticals therein, these known systems would have to be thoroughly cleaned between mixing one drink to the next to avoid cross contamination of the pharmaceuticals therein. The present disclosure is directed toward solving these and other problems.

SUMMARY OF THE INVENTION

According to an aspect of the present disclosure, a beverage mixing system is disclosed in which dry or liquid compounds contained within a removable compounding module or pod are physically isolated from all moving mechanical parts of a stationary part of the beverage mixing system. The stationary part (e.g., the part of the beverage mixing system sitting on a counter and not the vessel and not the pod) of the beverage mixing system can include a drive shaft or other moving structure that contacts part of the compounding module. Such moving mechanical structures of the beverage mixing system that physically interface with any part of the compounding module are physically isolated from becoming contaminated by any material contained within the removable compounding module, which in some cases can include pharmaceutical materials. Accordingly, the operator or user of the beverage mixing system does not have to clean the moving mechanical structures from consecutive usages of one compounding module to another, nor need to worry about cross-contamination of any material contained within one compounding module to another. Of course, any moving structures of the compounding module can be completely immersed in the material contained in the compounding module. For example, the compounding module is a one-time use, discardable item, which is inserted into a holder of the stationary part of the beverage mixing system (or otherwise coupled thereto), the contents of the compounding module are removed into a drinking vessel or container, and the module is removed from the holder following use and finally discarded.

According to another aspect of the present disclosure, which can be related to any other aspect disclosed herein, the moving mechanical part or parts of the stationary part of the beverage mixing system involved in mixing the material contained within a compounding module into a homogeneous and optionally isotropic liquid solution can be operable to move in two or more distinct and independent or coordinated motions. For example, in aspects in which the beverage mixing system includes a drive shaft, the drive shaft can be configured to impart a translation motion (e.g., up and down) to at least a portion of the compounding module relative to a beverage container or vessel. Independently or simultaneously, the drive shaft can also be configured to impart a rotational motion (clockwise and/or anti-clockwise) to at least a portion of the compounding module. These two types of motions of the drive shaft can be coordinated to move the drive shaft and the at least a portion of the compounding module according to any combination of up, down, clockwise, or anti-clockwise motions to produce a homogenous and/or isotropic liquid solution in which the material from the compounding module is thoroughly and uniformly interspersed throughout a precursor liquid. In some implementations of the present disclosure, the drive shaft can impart a variety of other motions to the at least a portion of the compounding module, such as, for example, churning, vibrating, pulsing, etc. As mentioned above, the moving mechanical structures of the beverage mixing system can be isolated from any material contained within the compounding module.

According to a further aspect of the present disclosure, which can be related to any other aspect disclosed herein, the compounding module has a removable base that couples as a stirring or mixing element, and this removable base provides a hermetically sealed interface with the rest of the compounding module so that material contained therein does not leak or spill out and so that foreign contaminants external to the compounding module do not impinge the interior of the compounding module. When the compounding module includes pharmaceutical material, it is important that this material remain completely inside the compounding module until use, and that external matter or effects (e.g., humidity) outside the compounding module cannot taint or contaminate the material contained within the compounding module. The removable base can include an element involved in mixing the material contained within the compounding module into a precursor liquid provided in a drinking vessel or container. This removable base can be retracted back into the rest of the compounding module following use, so that the compounding module together with the removable base can be discarded as a unitary unit.

It should be emphasized that the moving parts of the stationary part of the beverage mixing system involved in mixing can be directed toward or away from an opening of a drinking vessel or container, or the drinking vessel itself can be moved toward or away from the moving parts involved in mixing, or a combination of both are expressly contemplated. The present disclosure also contemplates a drinking vessel or container that houses the compounding module as a unitary unit (similar to a thermos), with the compounding module having a mixing element to agitate a precursor liquid together with material contained within the compounding module in situ without having to move the compounding module and the drinking vessel relative to one another. Part of the compounding module interfaces with a moving part of a stationary part of the beverage mixing system. The stationary part refers to the part of the mixing system that rests on a surface during use. The drinking vessel and compounding module are removable from the mixing system, though they become part of it when inserted therein during operational use. The term "drinking vessel" is not intended to mean that an animal (e.g., a human) actually drinks from this vessel. For example, the contents of the drinking vessel may be poured into another vessel, which is provided to an animal to drink or ingest.

According to a still further aspect of the present disclosure, which can be related to any other aspect disclosed herein, the stationary part of the beverage mixing system includes a coupling mechanism or holder that securely holds the compounding module relative to the drinking vessel so that when a moving part of the stationary part of the beverage mixing system interfaces with a moving part of the compounding module, a non-moving part of the compounding module remains in a relative fixed position. By "relative" it is contemplated that the coupling mechanism or holder can move with the compounding module, while allowing relative movement of the corresponding moving parts. As discussed above, the moving part of the stationary part of the beverage mixing system is capable of translation motion and rotational motion, and these two motions can be carried out while the compounding module is coupled to the coupling mechanism or holder of the stationary part without imparting those same motions to the non-moving part of the compounding module. In other words, for example, the non-moving part of the compounding module does not move in the same manner as the particular movement being imparted to the moving part of the stationary part of the beverage mixing system and/or to the moving part of the compounding module.

Relatedly, the compounding module itself includes a coupler that is received in the coupling mechanism or holder of the stationary part of the beverage mixing system either manually (e.g., by a human positioning the compounding module in the coupling mechanism) and/or automatically (e.g., by a robot automatically positioning the compounding module in the coupling mechanism or by the compounding module automatically falling into engagement with the coupling mechanism like in a vending machine-type configuration). These two interfaces, on both compounding module and on the stationary part, allow the compounding module to be easily inserted into and removed from the stationary part with a minimum number of acts on the part of the operator (e.g., human or machine) required for insertion and removal. The insertion and removal procedures are frustration-free, and in some aspects, require only a single, one-handed action by the operator. In other aspects, a maximum of two actions (one or two-handed) are required by the operator (e.g., human or machine) for insertion and removal. For example, one action can insert the module into the coupling mechanism or holder, and another action can lock the module into the coupling mechanism or holder. Alternately, a single action can both couple the module relative to the coupling mechanism or holder as well as fix the module relative to the coupling mechanism or holder. The reverse of the action or actions or a different action or actions can be required to remove the module from the coupling mechanism or holder. An action can be defined as being initiated by the user's touching a structure (e.g., the module or the stationary part) and completed when the user stops touching that same structure while using only one motion in one direction between starting to touch and stopping the touch. If the user is required to touch another structure to affect complete insertion or removal of the module relative to the stationary part, or is required to change the motion in a different direction, this is defined to be a further action. Thus, a "single-action insertion" would start by the user grasping the module and moving it into position for insertion, and inserting the same by one motion in one direction into the coupling mechanism or holder of the stationary part, which causes the module to be securely received by the coupling mechanism or holder. The user releases the module, thereby completing the single-action insertion. Likewise, to release the module using a "single-action removal," the user starts by grasping the module and pulling it a direction away from the coupling mechanism or holder to completely release the module from the coupling mechanism or holder that previously held it in place relative to the stationary part. Optionally, a twisting action can also be required as part of insertion or removal of the module, but this can be carried out without the user's having to release the module from being grasped. The mixing or agitation can be carried out automatically following proper insertion (and optionally once the beverage mixing system confirms that a properly sized drinking vessel is also present), or the user can activate an interface, such as a physical pushbutton or button on a touchscreen of the beverage mixing system, to initiate mixing or agitation. In some aspects, the coupling of the module with the stationary part should be "orientation agnostic," meaning that it does not matter what orientation the user inserts the module into the coupling mechanism or holder to be received securely relative thereto. Here, orientation does not mean right-side-up (e.g., base of the module pointing toward the drinking vessel) versus upside-down (e.g., base of the module pointing away from the drinking vessel), but rather an orientation taken along an axis passing from a top of the module to its base.

According to yet another aspect of the present disclosure, which can be related to any aspect disclosed herein, the compounding module has a form or shape that ensures that substantially all of the material contained within the module exits the module when its base is removed. Of course, when the material takes a powder or slurry form, some of the material will stick to the inner walls of the module due to attraction forces, so the term "substantially all" allows that some material will remain stuck to the inner walls of the module. However, what is not desired is for a meaningful portion of the material to remain within the module when the base has been removed. For example, in aspects in which gravity is the only force acting upon the material to cause it to exit the compounding module, the form or shape of the compounding module can be designed to ensure a maximal amount of material will succumb to the gravitational force acting upon it. The shape or form contemplated herein also allows for some "clumping" of the material to occur, such as due to humidity or other environmental effects external to the module during storage or transportation, but notwithstanding any such clumping, most or substantially all of the material will still exit the module during operational use. For example, sharp transitions inside the module should be avoided, so that the material constantly encounters smooth or gently rounded transitions throughout the interior of the compounding module. The compounding modules should accommodate different amounts of material as well, for example, so different sizes of compounding modules should have the same form factor to be used within the same beverage mixing system with no further accommodation or modification thereto. In a very specific but non-limiting example, it has been found that a housing resembling an elongated, "Bundt" cake design works very well for a range of materials and environmental conditions. This design also advantageously fulfills another aspect disclosed herein in which the moving parts of the stationary part of the beverage mixing system are physically isolated from any material in the compounding module. Principles for a well-designed module include no sharp transitions or corners in the interior of the housing, optional smooth protrusions or channels, and/or an optional hydrophobic coating inside the housing, such as when the material takes on a slurry form instead of a dry material.

According to a still further aspect of the present disclosure, which can be related to any other aspect disclosed herein, each compounding module can include a machine-readable tangible medium or structure (e.g., a unique identifier), such as a barcode or QR code printed on a label, an RFID tag, an NFC chip, etc. For convenience, these media or structures will simply be referred to as a code. Each code can be used to track uses of the compounding modules, and the beverage mixing system can store this usage information. For example, when the compounding module includes a pharmaceutical material, the beverage mixing system can automatically send signals to a pharmacy or physician for reordering a further batch of compounding modules with an appropriate prescribed amount of pharmaceutical(s). Each code can also be used by the beverage mixing system to authenticate the compounding module. Particularly when pharmaceutical material is present, ensuring that only approved compounding modules are used is important to prevent intentional or inadvertent improper ingestion of pharmaceuticals or dispensation to the wrong individual. In this respect, the beverage mixing system can include a graphical user interface (GUI) that requires the user to authenticate his or her credentials prior to allowing dispensation of the contents of the compounding module into a drinking vessel. In this aspect, the beverage mixing system has two levels of authentication—one at the user level to authenticate an identity of the user, and one at the module level to authenticate that the module is from an approved source. The beverage mixing system can also use the code to track usage history to prevent an overdose or excessive consumption, for example. When the compounding module material includes a material of interest, such as, for example, a pharmaceutical and/or any other material that may be dangerous in large quantities (e.g., excessive calcium in older males, excessive iron in small children), the beverage mixing system can extract from the code a frequency of dispensation of the material of interest, and only permit the dispensation of the material of interest at the time intervals extracted from the code. In some implementations, when the compounding module does not include a pharmaceutical, but instead, for example, contains a nutritional supplement, the beverage mixing system can extract from the code a recommended minimum frequency of consumption of the nutritional supplement and permit the user to dispense the material at the time intervals extracted from the code. It should be emphasized that the beverage mixing system can accommodate the possible presence of pharmaceuticals in the compounding modules disclosed herein. Extracting information from the compounding module itself, such as via a code, is an important aspect, as well as authenticating an identity of a user of the beverage mixing system.

What follows in this summary section is several specific examples, which are not exhaustive of every conceivable aspect disclosed herein but which are contemplated by the present disclosure.

According to some implementations of the present disclosure, a compounding module for use in a beverage mixing system includes a housing, a sealing feature, a locking feature, and an agitator. The housing has an opening separating an inner surface from an outer surface. The housing also has a boss that extends through the housing such that part of the outer surface of the housing forms an inner bore of the boss having a terminus pointing toward the opening. The agitator has a base, a shaft, and a mixing element coupled to the base such that the base, in cooperation with the sealing feature, circumferentially seals the opening of the housing to form a cavity defined by the inner surface. The shaft passes through the inner bore. The locking feature when engaged permits independent or simultaneous translational and rotational movement of the shaft while an area between the terminus of the boss and the shaft remains mechanically sealed during the movement against liquid or powder encroachment into a clean area of the inner bore.

According to some implementations of the present disclosure, a compounding module for use with a beverage mixing system includes a housing and an agitator. The housing defines an interior cavity and includes a boss that extends from a first end of the housing into the interior cavity towards a second opposing end of the housing. The boss defines an inner bore. The agitator includes a base, a shaft, and a mixing element. The shaft of the agitator extends from the base and is slidably coupled to the boss such that the agitator is movable between a sealed position and an unsealed position. A portion of the shaft of the agitator defines an inner bore to be engaged by a drive shaft of the beverage mixing system during operation of the beverage mixing system. When the drive shaft engages the inner bore of the shaft of the agitator, the boss of the housing in conjunction with the shaft of the agitator isolate the drive shaft from the interior cavity of the housing.

According to some implementations of the present disclosure, a method of mixing a beverage using a compounding module and a beverage mixing system includes coupling the compounding module to the beverage mixing system. The compounding module includes an agitator slidably coupled to a housing defining an interior cavity. The housing includes a boss that extends from a first end of the housing into the interior cavity towards a second opposing end of the housing. The agitator has a base, a shaft, and a mixing element. The shaft of the agitator is non-rotationally engaged with a drive shaft of the beverage mixing system. The agitator is caused to move from a sealed position to an unsealed position such that the agitator translates relative to the housing. The drive shaft is rotated thereby causing the agitator to rotate in a corresponding manner. During the rotating and during the translating, the drive shaft is isolated from the interior cavity of the housing using the boss of the housing and the shaft of the agitator.

According to some implementations of the present disclosure, a compounding module including nutraceutical material for use with a nutraceutical beverage mixing system, the compounding module having a sealed configuration and an unsealed configuration, includes a housing and an agitator. The housing has a first end and a second opposing end defining an interior cavity. The first end of the housing includes a coupler to be engaged by a coupling mechanism of the nutraceutical beverage mixing system, thereby preventing the housing from rotating or translating relative to the coupling mechanism. The housing includes a boss that extends into the cavity from the first end of the housing towards the second end of the housing and defines an inner bore. The inner bore of the boss allows a portion of a drive shaft of the nutraceutical beverage mixing system to pass therethrough. The second end of the housing is open and includes a sealing feature. The agitator includes a base, a shaft, and a plurality of mixing elements. The shaft of the agitator has a first end adjacent to the base and a second opposing end. The shaft of the agitator extends generally perpendicular from the base. The shaft of the agitator slides within the inner bore of the housing. The plurality of mixing elements extends generally perpendicular from the base. A portion of the shaft of the agitator defines an inner bore to be engaged by the drive shaft. The inner bore of the shaft of the agitator has a plurality of agitator splines therein. The plurality of agitator splines defines a plurality of agitator channels therebetween to receive a plurality of drive shaft splines of the drive shaft when the drive shaft is engaged with the inner bore of the shaft of the agitator. The second end of the shaft of the agitator includes a collet to engage a notch of the drive shaft when the compounding module is in the unsealed configuration. The base includes a sealing feature to mate with the sealing feature of the housing when the compounding module is in the sealed configuration. When the drive shaft is engaged with the inner bore of the shaft of the agitator, the boss of the housing in conjunction with the shaft of the agitator isolate the drive shaft from the nutraceutical material when the compounding module is in the sealed configuration and the unsealed configuration.

Additional aspects of the present disclosure will be apparent to those of ordinary skill in the art in view of the detailed description of various implementations, which is made with reference to the drawings, a brief description of which is provided below.

BRIEF DESCRIPTION OF THE DRAWINGS

FIG. 9A is a partial perspective view of the drive shaft of the beverage mixing system and the compounding module in a first position according to some aspects of the present disclosure;

FIG. 9B is a partial cross-sectional view of the drive shaft of the beverage mixing system and the compounding module in the first position of FIG. 9A;

FIG. 10A is a partial perspective view of the drive shaft of the beverage mixing system and the compounding module in a second position according to some aspects of the present disclosure;

FIG. 10B is a partial cross-sectional view of the drive shaft of the beverage mixing system and the compounding module in the second position of FIG. 10A;

FIG. 11A is a partial perspective view of the drive shaft of the beverage mixing system and the compounding module in a third position according to some aspects of the present disclosure;

FIG. 11B is a partial cross-sectional view of the drive shaft of the beverage mixing system and the compounding module in the third position of FIG. 11A;

FIG. 17B is an exploded perspective view of the alternative compounding module of FIG. 17A;

FIG. 17C is an exploded perspective view of the alternative compounding module of FIG. 17A;

FIG. 18D is an exploded cross-sectional view of the alternative compounding module and the alternative coupling mechanism of FIG. 18A;

FIG. 18E is a partial cross-sectional view of a sealing feature of the alternative compounding module of FIG. 18A;

Figure 1A:
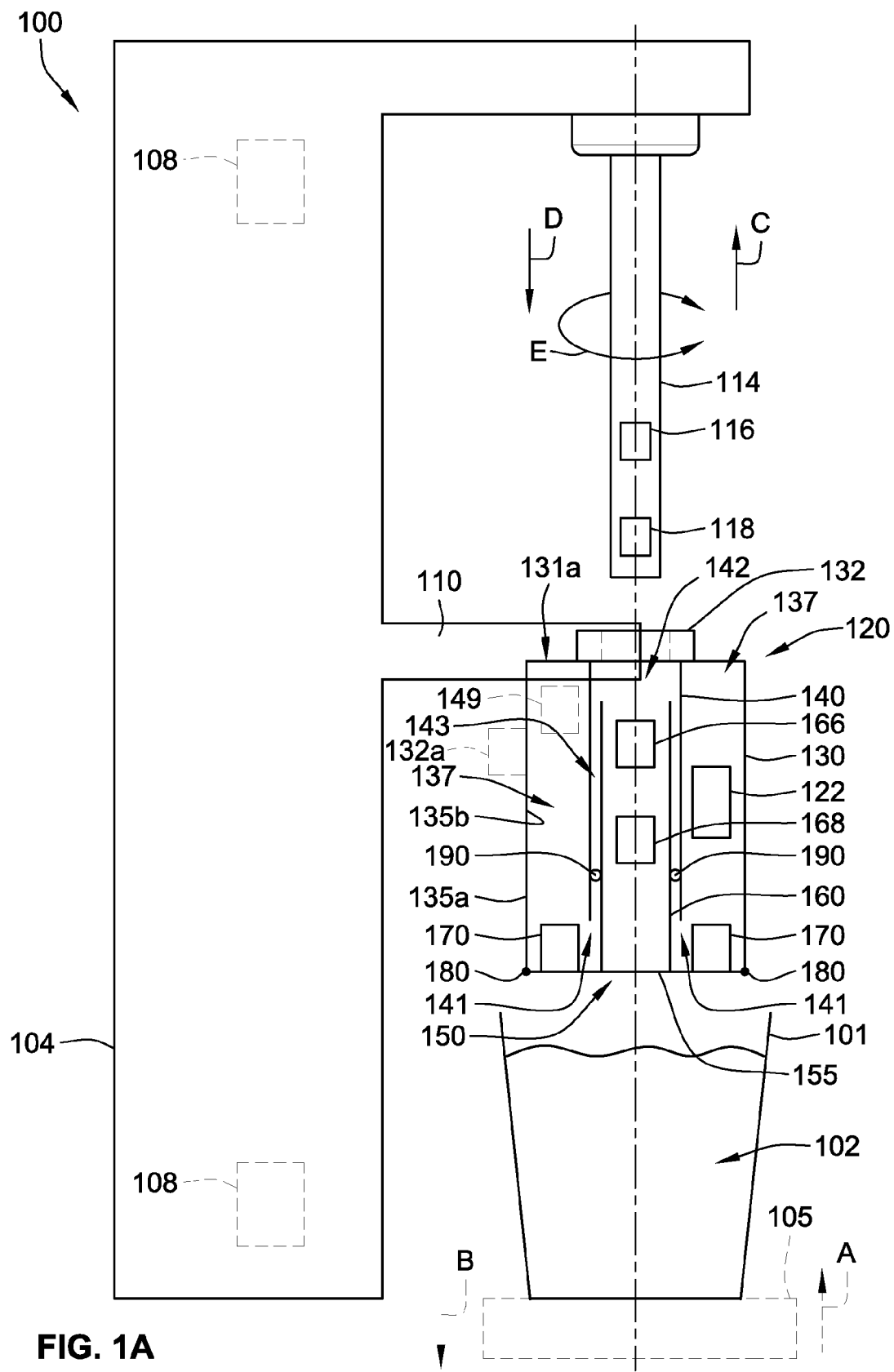
FIG. 1A is a block schematic diagram of a beverage mixing system and a compounding module in a first position according to some aspects of the present disclosure.

While the present disclosure is susceptible to various modifications and alternative forms, specific implementations have been shown by way of example in the drawings and will be described in detail herein. It should be understood, however, that the present disclosure is not intended to be limited to the particular forms disclosed. Rather, the present disclosure is intended to cover all modifications, equivalents, and alternatives falling within the spirit and scope of the present disclosure as defined by the appended claims.

DETAILED DESCRIPTION

While this disclosure is susceptible to embodiment in many different forms, there is shown in the drawings and will herein be described in detail preferred implementations of the disclosure with the understanding that the present disclosure is to be considered as an exemplification of the principles of the disclosure and is not intended to limit the broad aspect of the disclosure to the implementations illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

It will be understood that the term "nutraceutical," indicates a portmanteau of the words "nutrition" and "pharmaceutical," and as used herein is a food or food product that reportedly provides health and/or medical benefits, including the prevention and treatment of disease, and that this food or food product may be of any kind, but can be the form of a dry or fluid (e.g., a slurry) concentrate intended for combination with a liquid (such as water) prior to ingestion by an end user. Nothing herein will limit the interpretation to requiring a pharmaceutical product. It will also be understood that nutraceutical may additionally include those compounds, vitamins, flavorings, minerals, drugs, or pharmaceutical compositions (without limit to any) that are believed to have a physiological benefit or provide protection against chronic disease. With recent developments in cellular-level nutraceutical agents the proposed use will be understood as non-limiting and is to be broadly interpreted to include any complementary and/or alternative therapies now known or later developed. It will further be understood that nutraceutical may additionally or alternatively include probiotics, viruses, antibodies, DNA, RNA, any other living organisms, or any combinations thereof.

Referring to FIG. 1, a beverage mixing system 100 for mixing a beverage in a vessel 101 is illustrated as a block diagram. A compounding module 120 including a nutraceutical compound 122 therein is coupled to the beverage mixing system 100. The vessel 101 includes a fluid 102 (e.g., water) to be mixed with the nutraceutical compound 122 to create a mixed beverage having a homogeneous consistency suitable for drinking. The vessel 101 is positioned on an optional base 105 of a body 104 of the beverage mixing system 100. The base 105 can be integral with the body 104 or separate. In some implementations, the base 105 is stationary, yet in some alternative implementations, the base 105 is movable with respect to the body 104 in the direction of arrows A and B (e.g., the base 105 translates upward and/or downward relative to the body 104).

The beverage mixing system 100 includes the body 104, the optional base 105, one or more motors 108, a coupling mechanism 110, and drive shaft 114. The motors 108 are operable to cause one or more portions of the beverage mixing system 100 to move. For example, the motors 108 can cause the drive shaft 114 to translate along its axis generally upward in the direction of arrow C and/or generally downward in the direction of arrow D. For another example, the same motor 108 or one or more different motors 108 can cause the drive shaft 114 to rotate clockwise or counterclockwise in the directions of arrow E. For another example, the motors 108 can cause a portion of the housing 104 of the beverage mixing system 100 to translate relative to another portion of the housing 104.

The motors 108 can be controlled (e.g., by one or more controllers and/or computers) to cause the drive shaft 114 to translate and rotate individually or simultaneously. By simultaneously, it is meant that the drive shaft 114 can rotate and translate at the exact same time or at almost the same time. For example, the drive shaft 114 can translate from a first position/loading position shown in FIG. 1A to a second position/engaged position shown in FIG. 1B without rotating. For another example, the drive shaft 114 can rotate about its axis when the drive shaft 114 is in a third position/operating position shown in FIG. 1C without translating. For yet another example, the drive shaft 114 can rotate at the same exact time that the drive shaft 114 is translating from the engaged position (FIG. 1B) to the operating position (FIG. 1C), vice versa.

Alternatively to the drive shaft 114 translating, the optional base 105 of the beverage mixing system 100 can translate in the direction of arrows A and/or B to impart the same general motions as if the drive shaft 114 were translating relative to the compounding module 120.

The drive shaft 114 includes a translation locking feature 116 and a rotation locking feature 118 that are operable to engage with corresponding locking features (e.g., translation locking feature 166 and rotation locking feature 168) of the compounding module 120 to lock relative translation and rotation of the drive shaft 114 with an agitator 150 of the compounding module 120 as described herein.

The compounding module 120 includes a housing 130 and the agitator 150. The housing 130 has a first end 131a and a second open end 131*b* (FIG. 1C). The second open end 131*b* separates an outer surface 135*a* of the housing 130 from an inner surface 135*b* of the housing 130. The housing 130 includes a cavity 137 for storing the nutraceutical compound 122 (FIGS. 1A and 1B) prior to mixing the beverage in the operation position (FIG. 1C). The cavity 137 is generally defined by the inner surface 135*b* of the housing 130 and a portion of the agitator 150.

The housing 130 includes a coupler 132 protruding from the first end 131*a* of the housing 130. The coupler 132 is operable to be engaged by the coupling mechanism 110 of the beverage mixing system 100. The engagement of the coupler 132 with the coupling mechanism 110 prevents relative rotation and relative translation of the housing 130 with respect to the beverage mixing system 100. That is, the coupling mechanism 110 grabs and locks the coupler 132 in place to hold the housing 130 of the compounding module 120 during a mixing operation (shown in FIG. 1C).

The housing 130 also includes a boss 140 that extends through the housing 130 from the first end 131*a* towards the second open end 131*b* (FIG. 1C). The boss 140 defines an inner bore 142 that extends the entire length of the boss 140. Part of the outer surface 135*a* of the housing 130 forms the inner bore 142 of the boss 140. That is, the outer surface 135*a* of the housing 130 and an inside surface of the inner bore 142 are contiguous like, for example, the outer surface of a bunt cake pan. The boss 140 includes a terminus or end 141 that points toward the second open end 131*b* (FIG. 1C) of the housing 130.

The housing 130 can be made of any material or combination of materials, such as, for example, plastic, metal, rubber, etc. The housing 130 can have any shape, such as, for example, the housing can have a generally cup-like shape, a circular shape/cross-section, a square shape/cross-section, a triangular shape/cross-section, a polygonal shape/cross-section. The housing 130 can have any size, such as, for example, between about one inch and about five inches in height, more preferably, the housing 130 is about three inches in height. The housing 130 is between about one half inch and three inches in diameter/width, more preferably, the housing is about two inches in diameter/width. The housing 130 can be transparent, opaque, or a combination thereof.

The housing 130 can include one or more optional module identifiers 149 on the outer surface 135*a*, the inner surface, 135*b*, or in-between (i.e., built into the housing 130). The optional module identifiers 149 can be a label, a sticker, printed directly on the housing 130, a QR code, a barcode, a near field communication ("NFC") chip, a radio frequency identification ("RFID") tag, an indicia, or any combination thereof. The optional module identifiers 149 can include and/or represent any combination of the following information: contents of the compounding module 120 (e.g., what nutraceutical compound 122 is contained therein), mixing information/program for mixing the nutraceutical compound 122 sufficiently to obtain a homogeneous mixture/solution, lot information of the nutraceutical compound 122, an expiration date of the nutraceutical compound 122, reorder information, manufacturer information (e.g., name, address, website, etc.), authentication information to authenticate a user or consumer of the nutraceutical compound, etc.

While the coupler 132 is shown and described as protruding from the first end 131*a* of the housing 130, the coupler 132 can protrude from any portion of the housing 130, such as, for example, the side of the housing 130 illustrated by optional side coupler 132*a*, the bottom of the housing 130 (not shown), etc.

The agitator 150 of the compounding module 120 has a base 155, a shaft 160, and mixing elements 170. The shaft 160 and mixing elements 170 extend generally perpendicular from the base 155. A portion of the shaft 160 is positioned within the inner bore 142 of the boss 140. As is evident from a comparison of FIGS. 1A and 1C, the shaft 160 is slidably coupled to the boss 140 such that the agitator 150 can translate in the direction of arrow D from a sealed position (FIG. 1A) to an unsealed position (FIG. 1C).

When the agitator 150 is in the sealed position (FIG. 1A), a sealing feature 180 of the compounding module 120 circumferentially seals the cavity 137 of the housing 130, thereby protecting the nutraceutical compound 122 contained therein from, for example, moisture, dirt, etc. outside the compounding module 120. The sealing feature 180 can be integral with the housing 130, the base 155, or both. The sealing feature 180 can include, for example, a snap fit connection between the base 155 and the housing 130, a threaded connection between the base 155 and the housing 130, a glue connection between the base 155 and the housing 130, a welded connection (e.g., sonic welding) between the base 155 and the housing 130, a tape connection between the base 155 and the housing 130, a press-fit connection between the base 155 and the housing 130, etc. In some implementations, the sealing feature 180 includes a seal that is separate and distinct from the housing 130 and the agitator 150. For example, the sealing feature 180 includes a gasket (e.g., a rubber gasket, a plastic gasket, etc.) positioned between the housing 130 and the base 155.

The shaft 160 includes a translation locking feature 166 and a rotation locking feature 168. The translation locking feature 166 corresponds with the translation locking feature 116 of the drive shaft 114 and the rotation locking feature 168 corresponds with the rotation locking feature 118 of the drive shaft 114.

Figure 1B:
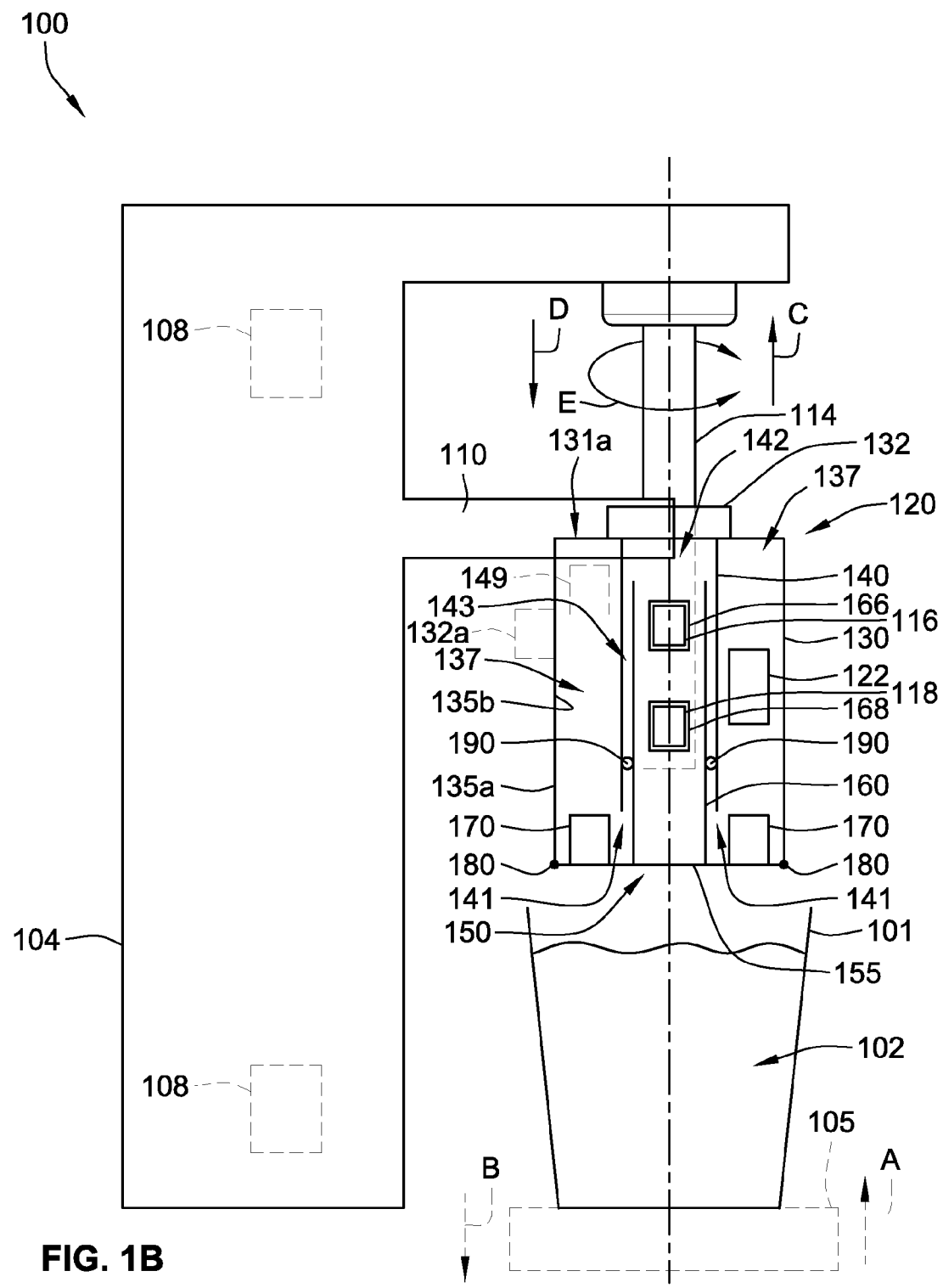
FIG. 1B is a block schematic diagram of the beverage mixing system and the compounding module of FIG. 1A in a second position.
Figure 1C:
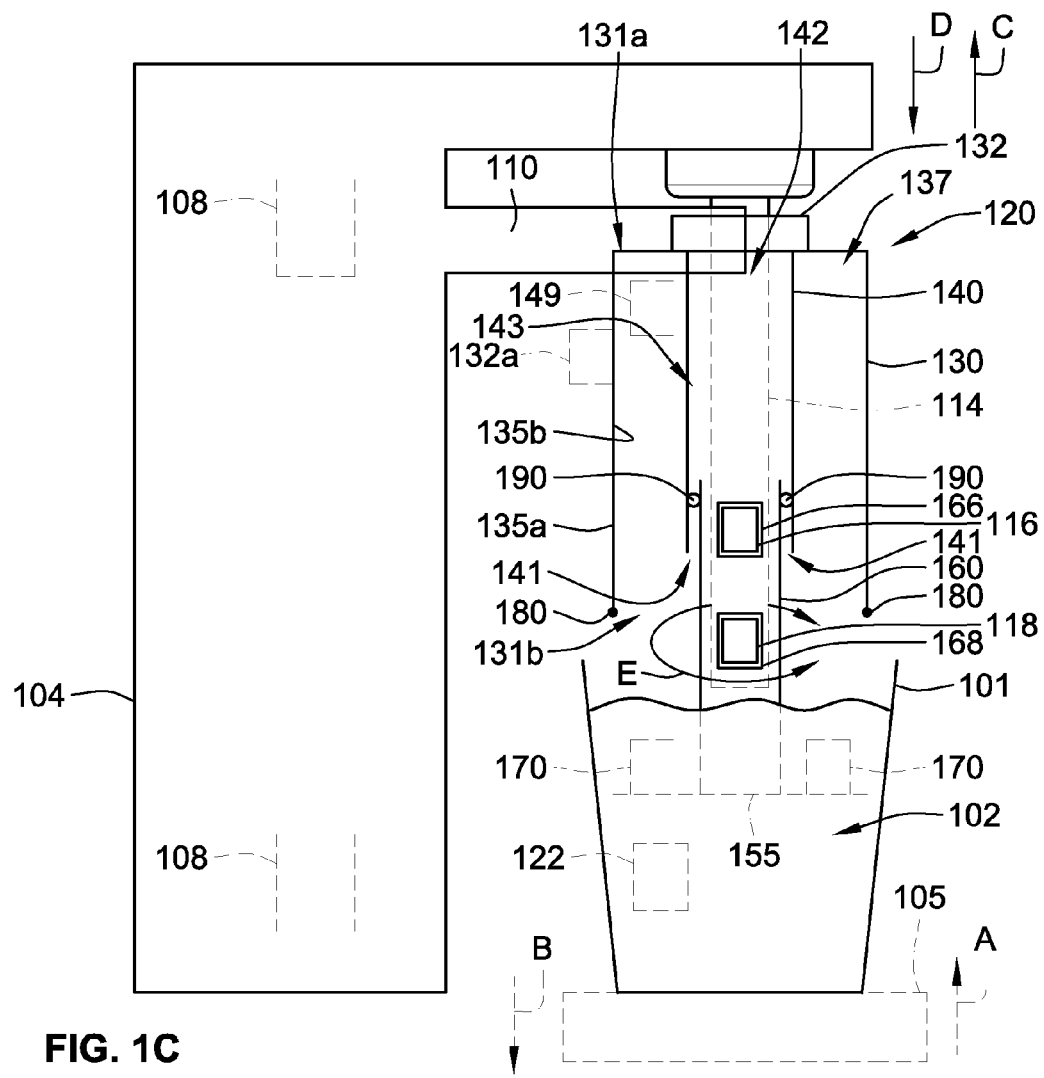
FIG. 1C is a block schematic diagram of the beverage mixing system and the compounding module of FIG. 1A in a third position.

As is evident from a comparison of FIGS. 1A, 1B, and 1C, as the drive shaft 114 translates in the direction of arrow D from the first position/loading position (FIG. 1A), the drive shaft 114 initially passes through an opening in the coupler 132 and then reaches the inner bore 142 of the boss 140. Continued translation of the drive shaft 114 in the direction of arrow D causes the translation locking feature 116 and the rotation locking feature 118 of the drive shaft 114 to engage the translation locking feature 166 and the rotation locking feature 168 of the shaft 160 of the agitator 150 in the second position/locked position (FIG. 1B), thereby locking relative translation and relative rotation of the drive shaft 114 and the agitator 150. The relative translation and the relative rotation remain locked during translation of the drive shaft 114 and the agitator 150 between the second position/locked position (FIG. 1B) and a third position/operating position (FIG. 1C). That is, the relative locked translation and rotation of the drive shaft 114 and the agitator 150 remain locked while the drive shaft 114 is located between the locked position (FIG. 1B) and the operating position (FIG. 1C).

Further translation of the drive shaft 114 in the direction of arrow D causes the agitator 150 to slide relative to the housing 130. Specifically, the base 155 separates from the housing 130, thereby breaking the sealing feature 180, and the shaft 160 slides in the direction of arrow D within the inner bore 142 of the boss 140. As the agitator 150 translates in the direction of arrow D, the mixing elements 170 on the base 155 are positioned within the fluid 102 in the vessel 101 and the nutraceutical compound 122 begins to fall due to gravity from the cavity 137 and into the vessel 101 (FIG. 1C).

After the drive shaft 114 translates into the operating position (1C), thereby positioning the agitator 150 within the vessel 101, rotation of the agitator 150 can commence to mix the fluid 102 and the nutraceutical compound 122 therein into a homogeneous consistency suitable for drinking. As the drive shaft 114 rotates, the agitator 150 rotates therewith such that the mixing elements 170 mix the fluid 102 and the nutraceutical compound 122. During the mixing, the drive shaft 114 can solely rotate or additionally translate.

It is contemplated that, depending on the contents of the nutraceutical compound 122, various mixing programs can be used by the beverage mixing system 100. For example, for a first nutraceutical compound, the beverage mixing system 100 uses a first mixing program where only rotation is imparted to the agitator 150. For another example, for a second nutraceutical compound, the beverage mixing system 100 uses a second mixing program where the agitator constantly rotates while translating between the second position (FIG. 1B) and the third position (FIG. 1C). For yet a third example, for a third nutraceutical compound, the beverage mixing system 100 uses a third mixing program where the agitator 150 is rotated for thirty seconds in the third position (FIG. 1C), then the agitator 150 is translated in the direction of arrow C to a fourth position (not shown), and then the agitator 150 is again rotated for an additional thirty seconds. Various other mixing programs are contemplated as falling within this disclosure.

During the operation of the beverage mixing system 100, the drive shaft 114 is isolated from encroachment by the fluid 102 and/or the nutraceutical compound 122. That is, while the compounding module 120 relies on the drive shaft 114 to impart rotation and/or translation to the agitator 150, the compounding module protects the drive shaft 114 from becoming contaminated by the fluid 102 and/or the nutraceutical compound 122 during the mixing operation (FIG. 1C). Such isolation is beneficial because it allows the beverage mixing system 100 to be used by multiple beverage drinkers using different nutraceutical compounds 122 without having to worry about cross contamination occurring to residual material being left on the drive shaft 114 from beverage mixing to beverage mixing. Further, such isolation reduces the level of maintenance/cleaning required to operate the beverage mixing system 100 compared to other systems that do not isolate the drive shaft.

Specifically, the drive shaft 114 is isolated by a mechanical seal 190 between the inner bore 142 of the boss 140 and the shaft 160 of the agitator 150 that prevents encroachment by the fluid 102 and/or the nutraceutical compound 122 into a clean area 143. The clean area 143 is an area between the inner bore 142 and the shaft 160 and that is above the mechanical seal 190. The mechanical seal 190 can be integral with the boss 140, the shaft 160, or both. The mechanical seal 190 can include an undercut and/or a notch in the inner bore 142 of the boss 140 and a corresponding protrusion in the shaft 160. In some implementations, the mechanical seal 190 can occur due to, for example, a relatively tight slidable coupling between the boss 140 and the shaft 160. In some implementations, the mechanical seal 190 includes a seal that is separate and distinct from the boss 140 and the shaft 160. For example, the mechanical seal 190 can include a gasket (e.g., a rubber gasket, a plastic gasket, etc.) positioned between the inner bore 142 and the shaft 160. Regardless of the configuration of the mechanical seal 190, the mechanical seal 190 aids in preventing encroachment of the fluid 102 and/or the nutraceutical compound 122 into the clean area 143, which aids in preventing contamination of the drive shaft 114.

A method of using the beverage mixing system 100 will now be described in reference to FIGS. 1A-1C. Initially, the compounding module 120 is coupled to the beverage mixing system 100 by mating the coupler 132 of the compounding module 120 with the coupling mechanism 110 of the beverage mixing system 100. The mating includes locking or snapping the coupler 132 into the coupling mechanism 110 in a non-rotational fashion to prevent rotation and translation of the housing 130 relative to the coupling mechanism 110. Then the drive shaft 114 is engaged with the agitator 150 by translating the drive shaft 114 in the direction of arrow D. Alternatively, the optional base 105 is translated in the direction of arrow A. The translating of the drive shaft in the direction of arrow D occurs until the translating and rotation locking features 116, 118 of the drive shaft 114 engage and lock with the translating and rotation locking features 166, 168 of the shaft 160 of the agitator 150 as shown in FIG. 1B. Then the translating continues such that the drive shaft 114 forces the base 155 of the agitator 150 to separate from the housing 130, thereby breaking the seal of the sealing feature 180 (FIG. 1C) and allowing the nutraceutical compound 122 to fall from the cavity 137 and into the vessel 101. Continued translating of the drive shaft 114 in the direction of arrow D occurs until the agitator 150 is in the operating position (FIG. 1C). With the agitator 150 in the operating position (FIG. 1C), the drive shaft 114 rotates causing the agitator 150 to rotate in a corresponding fashion. The rotation of the agitator 150 causes the mixing elements 170 to spin in the fluid 102, thereby causing the nutraceutical compound 122 to mix with the fluid 102 in the vessel 101. After the fluid 102 and the nutraceutical compound 122 are mixed to satisfaction, the drive shaft 114 begins to translate back to its loading position (FIG. 1A) in the direction of arrow C. As the agitator 150 is locked to the drive shaft 114, the agitator 150 also translates in the direction of arrow C until the base 155 of the agitator 150 engages the housing 130, thereby causing the sealing feature 180 to reengage. The reengagement of the sealing feature 180 causes the agitator 150 to be coupled to the housing 130 such that the agitator remains in its sealed position (FIGS. 1A and 1B). While the drive shaft 114 continues to translate in the direction of arrow C, due to the engagement of the base 155 with the housing 130, the agitator 150 no longer translates with the drive shaft 114. Specifically, continued translation of the drive shaft 114 in the direction of arrow C causes the translating and rotation locking features 116, 118 of the drive shaft 114 to disengage from the translating and rotation locking features 166, 168 of the shaft 160 of the agitator 150. The drive shaft 114 continues to translate in the direction of arrow C until the drive shaft 114 returns to its original loading position (FIG. 1A). After the drive shaft 114 returns to the loading position (FIG. 1A), the used compounding module 120 is removed from the beverage mixing system 100 by disengaging the coupler 132 from the coupling mechanism 110. As the drive shaft 114 was isolated during the mixing operation, the beverage mixing system 100 is immediately ready for another beverage mixing cycle with a new compounding module attached thereto.

Figure 2:
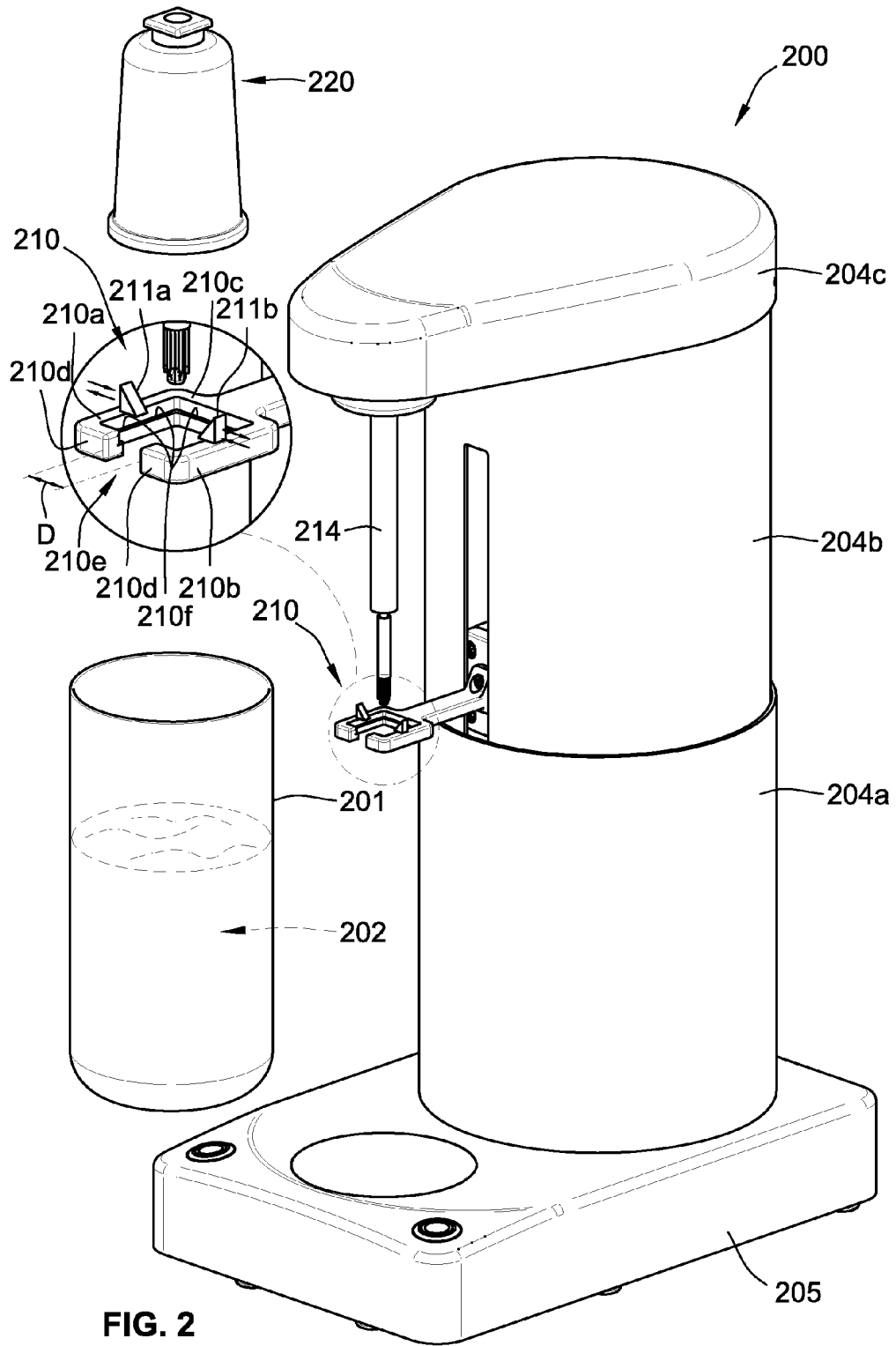
FIG. 2 is a perspective view of a beverage mixing system and a compounding module according to some aspects of the present disclosure.

Referring to FIG. 2, a beverage mixing system 200 is shown that is similar to the beverage mixing system 100 shown in FIG. 1A-1C and described herein. The beverage mixing system 200 includes a fixed body portion 204a, a translating body portion 204b, a lid body portion 204c, a base 205, a coupling mechanism 210, and a drive shaft 214. The fixed body portion 204a, the translating body portion 204b, and the lid body portion 204c are the same as, or similar to, the body portion 104 shown in FIGS. 1A-1C and described herein. The base 205 is the same as, or similar to, the optional base 105 shown in FIGS. 1A-1C and described herein. The coupling mechanism 210 is the same as, or similar to, the coupling mechanism 110 shown in FIGS. 1A-1C and described herein. The drive shaft 214 is the same as, or similar to, the drive shaft 114 shown in FIGS. 1A-1C and described herein.

One, some or all of the beverage mixing systems described herein are intended to be stationary by resting on a surface, such as a countertop, whereas in one, some, or all implementations, the compounding module described herein is removable from the stationary part of the beverage mixing system.

As shown in FIG. 2, a vessel 201 containing a fluid 202 (e.g., water) therein can be used with the beverage mixing system 200 in conjunction with a compounding module 220 to mix a beverage. The vessel 201 and the compounding module 220 are the same as, or similar to, the vessel 101 and the compounding module 120 shown in FIGS. 1A-1C and described herein.

Figure 3:
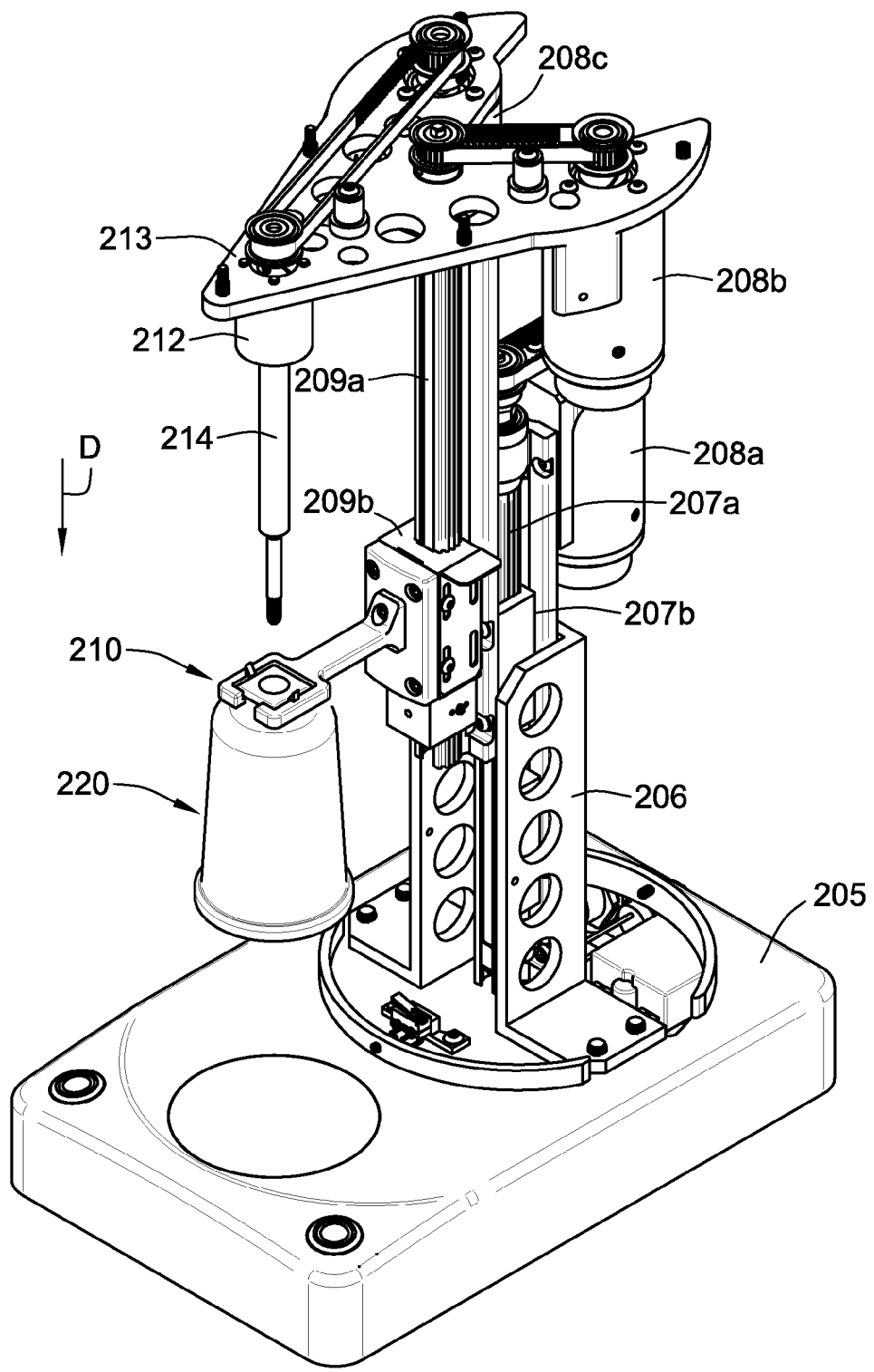
FIG. 3 is a perspective view of the beverage mixing system of FIG. 2 with an outer housing removed to illustrate several internal components and with the compounding module coupled to the beverage mixing system according to some aspects of the present disclosure.

Referring to FIG. 3, the beverage mixing system 200 is shown with the body portions 204a, 204b, and 204c removed to illustrate several internal components of the beverage mixing system 200. FIG. 3 also illustrates the compounding module 220 coupled to the beverage mixing system 200 via the coupling mechanism 210 with the drive shaft 214 being in a loading position. With the drive shaft 214 in the loading position (FIG. 3), the coupling mechanism 210 is readily accessible to load the compounding module 220.

Figure 7A:
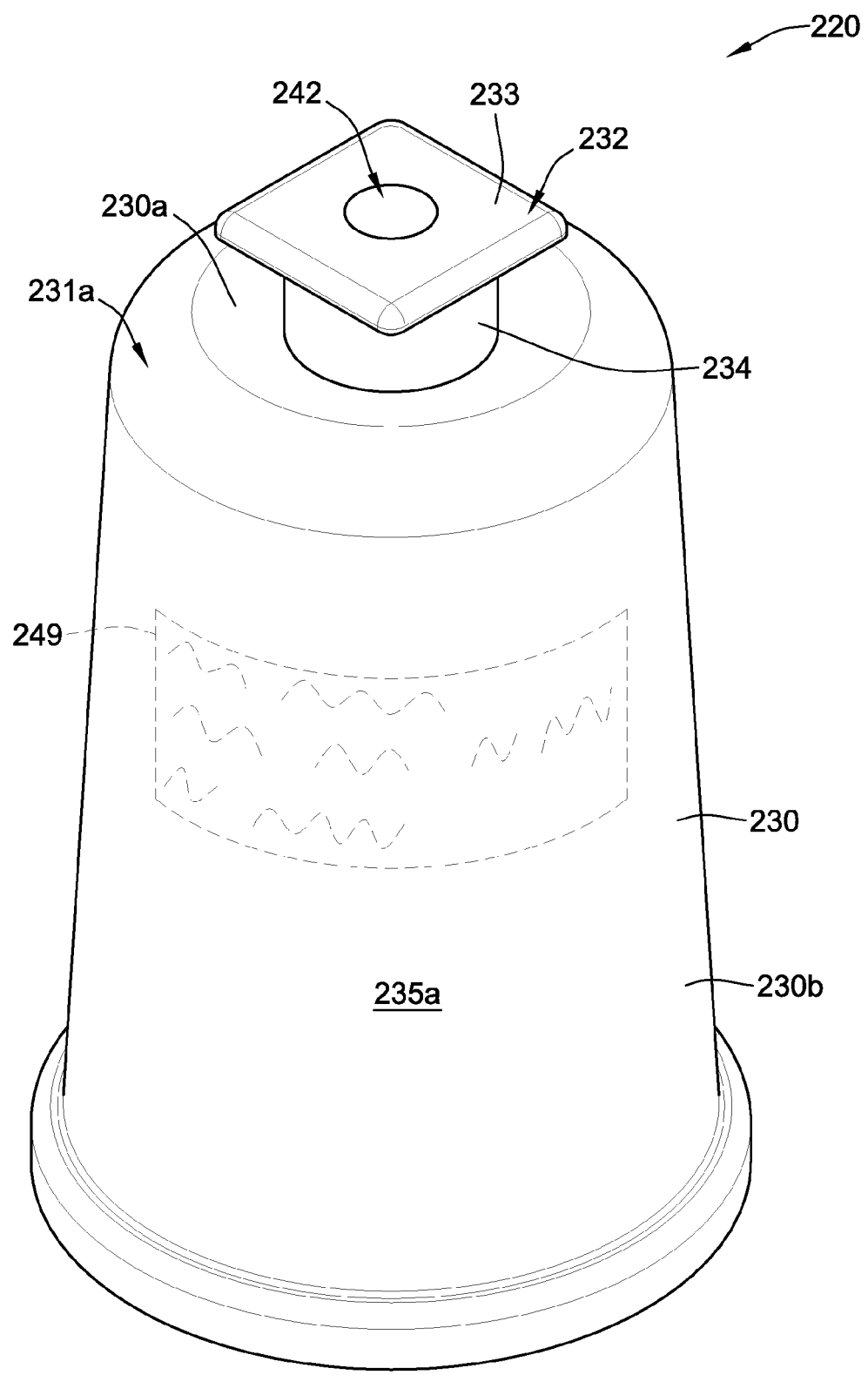
FIG. 7A is an assembled perspective view of the compounding module of FIG. 2.

As best shown in FIG. 2, the coupling mechanism 210 includes four walls 210a,b,c,d in a generally square orientation that corresponds to a generally square orientation of a head 233 (FIGS. 7A, 7B, 7D) of the coupler 232. Various other orientations for the walls 210a,b,c,d and the head 233 are possible (e.g., rectangular, oval, triangular, polygonal, etc.) so long as the orientations provide an anti-rotational function between the coupling mechanism 210 and the housing 230 of the compounding module 220.

The first and the second walls 210a,b of the coupling mechanism 210 are generally parallel. Similarly, the third and the fourth walls 210c,d of the coupling mechanism are generally parallel. Further, the third and fourth walls 210c,d are generally perpendicular to the first and second walls 210a,b forming the generally square orientation of the coupling mechanism 210. While the first, second, and third walls are generally contiguous, the fourth wall 210d includes an opening 210e therein having a width D. The opening 210e is wide enough such that a base 234 (FIGS. 7A, 7B, 7D) of the coupler 232 can pass therethrough. Each of the walls 210a, b,c,d forms a seating surface or ledge 210f that is suitable for supporting the head 233 when the compounding module 220 is loaded in the beverage mixing system 200. The coupling mechanism 210 also includes a pair of biased locking tabs 211a,b for removably retaining the compounding module 220 in the coupling mechanism 210 during operation of the beverage mixing system 200.

When loading the compounding module 220, an operator of the beverage mixing system 200 first positions the base 234 of the coupler 232 adjacent to the opening 210e in the fourth wall 210d with the head 233 of the coupler 232 positioned vertically above the walls 210a,b,c,d. Then the operator slides the base 234 through the opening 210e such that the head 233 is positioned above the biased locking tabs 211a,b and generally aligned with the seating surface 210f. Then the operator presses the coupler 232 vertically downward causing a bottom surface of the head 233 to engage the biased locking tabs 211a,b and move the biased locking tabs 211a,b horizontally outward, thereby allowing the head 233 to move vertically downward past the biased locking tabs 211a,b. After clearing the biased locking tabs 211a,b, the head 233 is seated on the seating surface 210f of the four walls 210 210a,b,c,d and the biased locking tabs 211a,b return to their biased home position locking the compounding module 220 in its vertical position. Specifically, the head 233 is positioned between the biased locking tabs 211a,b and the seating surface 210f. Due to the geometry of the walls 210a,b,c,d and the seating surface 210f therein, such a placement of the head 233 of the coupler 232 also locks rotational movement of the head 233 and, thus, the housing 230 of the compounding module 220.

Figure 4:
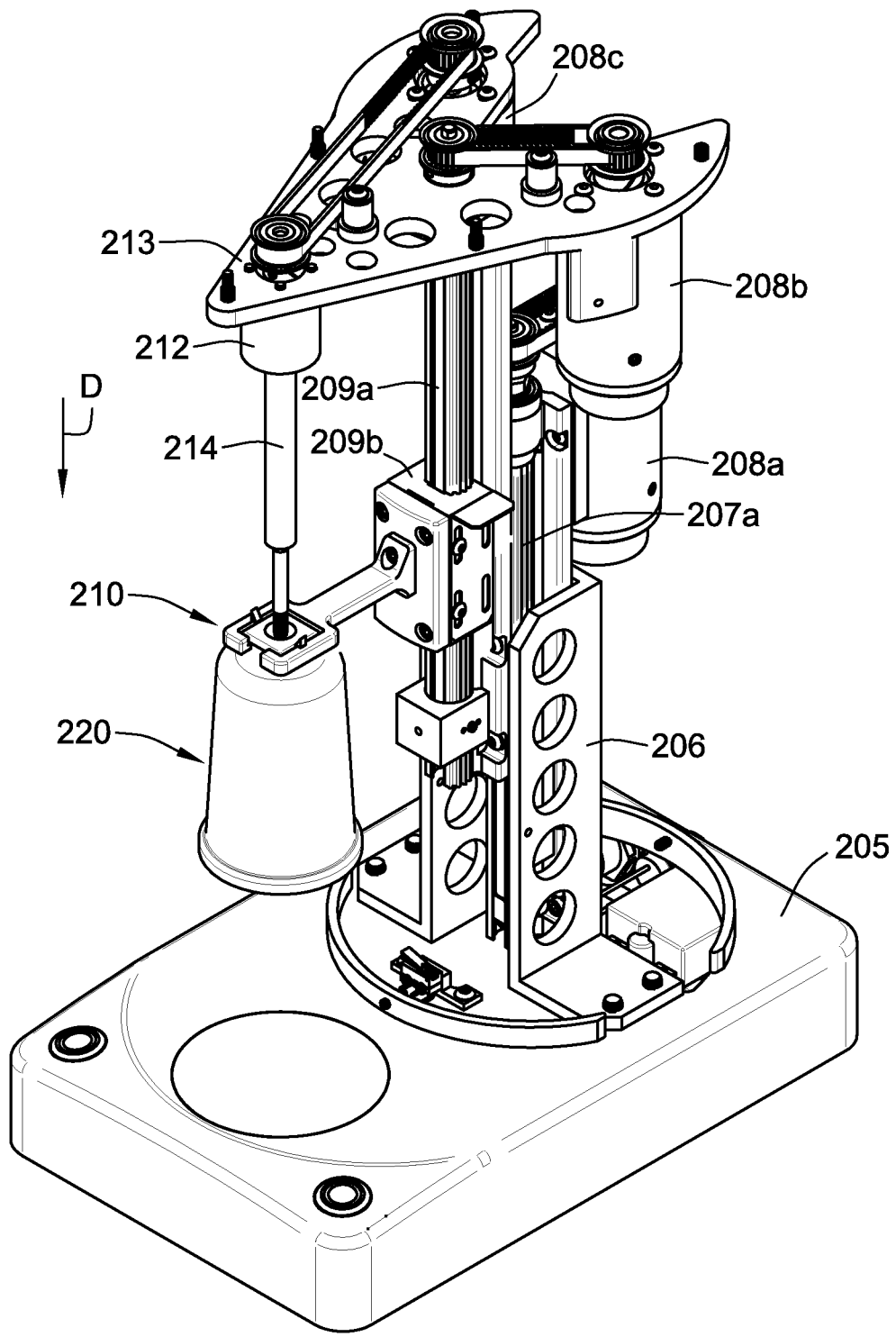
FIG. 4 is a perspective view of the beverage mixing system and compounding module of FIG. 3 with a drive shaft of the beverage mixing system engaging the compounding module in a first position.

After the compounding module 220 is loaded (FIG. 3), as described in relation to FIGS. 1A-1C, the drive shaft 214 translates in the direction of arrow D to engage the compounding module 220. As shown in FIG. 4, the drive shaft 214 has translated in the direction of arrow D and is about to engage the compounding module 220. Continued translation of the drive shaft 214 in the direction of arrow D causes the drive shaft to engage the compounding module 220 and position the beverage mixing system 200 in the operating position as shown in FIG. 5.

Figure 6:
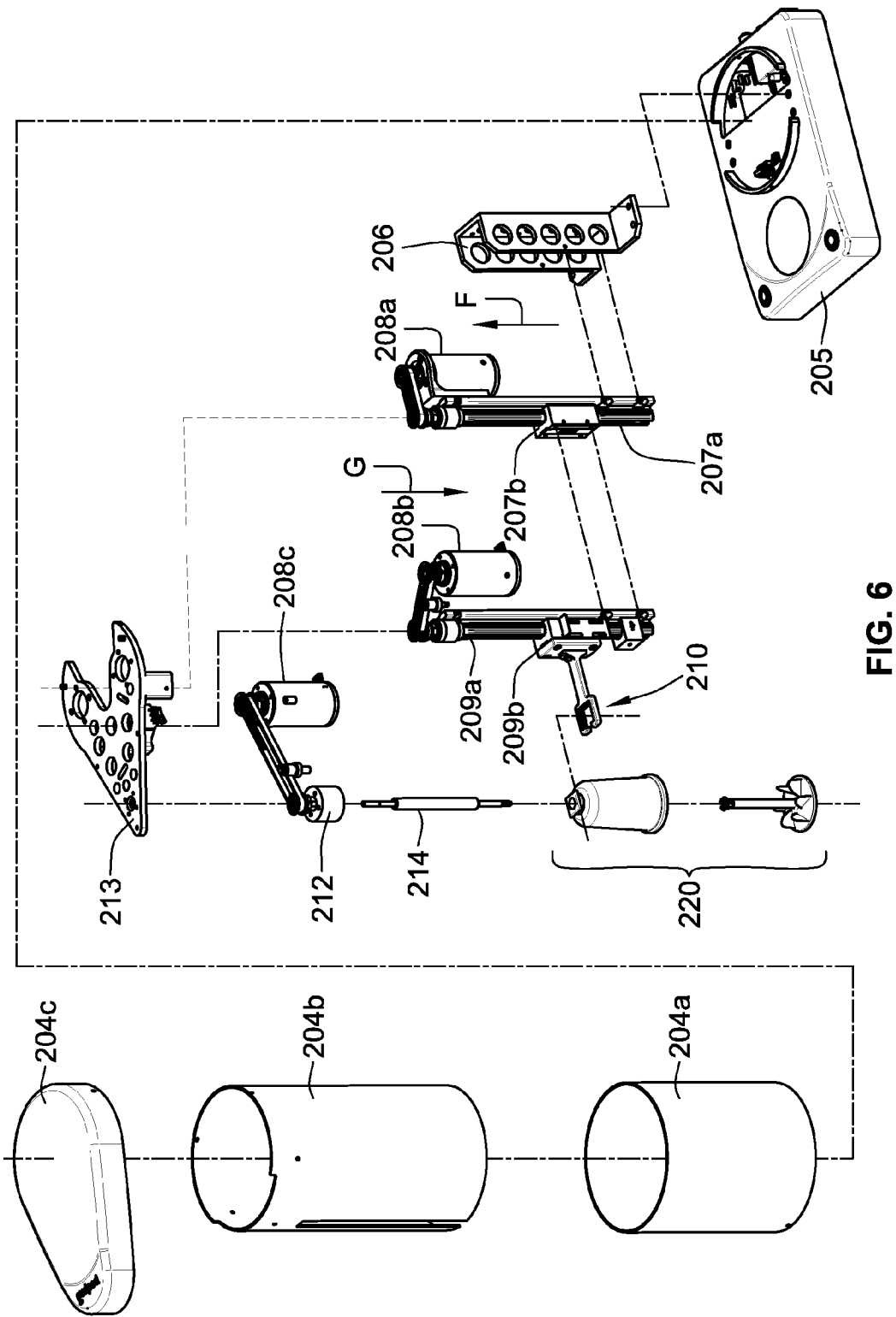
FIG. 6 is a partially exploded perspective view of the beverage mixing system and the compounding module of FIG. 2.

Referring to FIG. 6, an exploded view of the beverage mixing system 200 illustrates various internal components thereof. The internal components of the beverage mixing system 200 include a ground track/motor mounting 206, a ground track 207a, a ground carriage 207b, a ground motor 208a, a travel track 209a, a travel carriage 209b, and a travel motor 208b, a drive-shaft mounting 212, a drive shaft motor 208c, and a motor mounting 213.

Figure 5:
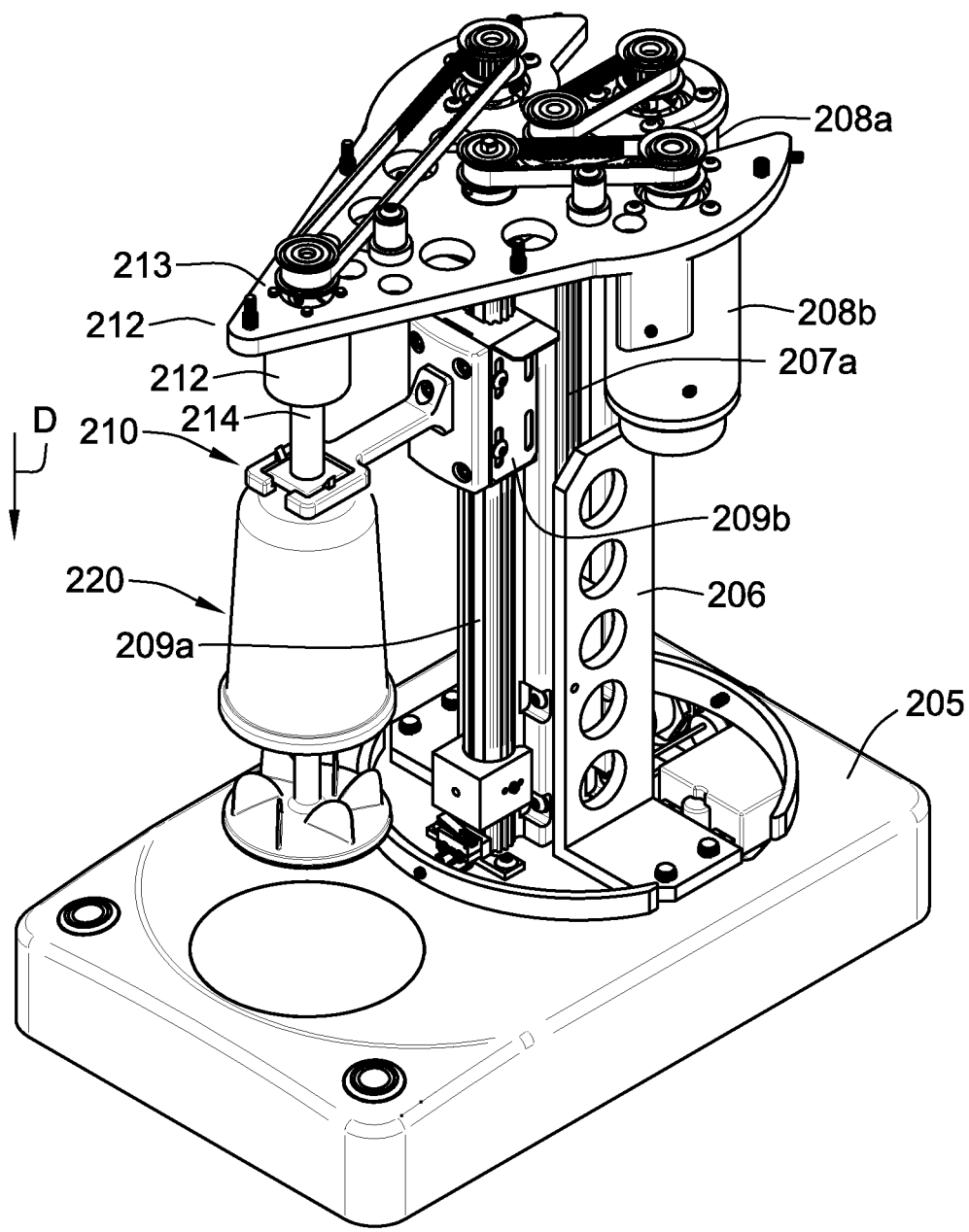
FIG. 5 is a perspective view of the beverage mixing system and compounding module of FIG. 3 with the drive shaft of the beverage mixing system engaging the compounding module in a second position causing an agitator of the compounding module to separate from a housing of the compounding module.

As shown generally in FIGS. 3-5, the ground track/motor mounting 206 is coupled to the base 205 using, for example, one or more fasteners (e.g., screws, rivets, welds, nails, etc.). The ground track/motor mounting 206 provides a rigid support for mounting the ground track 207a thereto in a fix relation to the base 205. The ground track 207a provides a track along which the ground carriage 207b travels under power of the ground motor 208a. Specifically, rotation of the ground motor 208a in a first direction causes the ground carriage 207b to translate in the direction of arrow F and rotation of the ground motor 208a in a second direction causes the ground carriage 207b to translate in the direction of arrow G.

The travel track 209a is mounted to the ground carriage 207b such that translation of the ground carriage 207b causes a corresponding translation of the travel track 209a and the travel motor 208b, which is coupled to the travel track 209a. The travel track 209a provides a track along which the travel carriage 209b travels under power of the travel motor 208b. Specifically, rotation of the travel motor 208b in a first direction causes the travel carriage 209b to translate in the direction of arrow F and rotation of the travel motor 208b in a second direction causes the travel carriage 209b to translate in the direction of arrow G. As the travel carriage 209b is coupled to the travel track 209a, the travel carriage 209b is able to translate independently from any translation of the ground carriage 207b. The coupling mechanism 210 is attached to the travel carriage 209b. As such, the coupling mechanism 210 can be translated by the travel motor 208b and/or the ground motor 208a.

The drive-shaft mounting 212 is coupled to the drive shaft 214. The drive-shaft motor 208c and the travel motor 208b are attached to the motor mounting 213. As such, translation of the ground carriage 207b results in a corresponding translation of the travel track 209a, the travel motor 208b, the drive-shaft mounting 212, the drive-shaft motor 208c, the motor mounting 213, and the drive shaft 214. While three separate and distinct motors 208a-c are shown and described, it is contemplated that a variety of other numbers of motors can be used to translate and rotate the drive shaft 214, such as, for example, two motors, one motor, etc. Specifically, one motor can be used to translate the drive shaft 214 and a second motor can be used to rotate the drive shaft 214, where no motor is used to separately translate the coupling mechanism 210. For another specific example, one motor can be used to translate and rotate the drive shaft, where no additional motors are needed in the beverage mixing system.

Figures 7B, 7C:
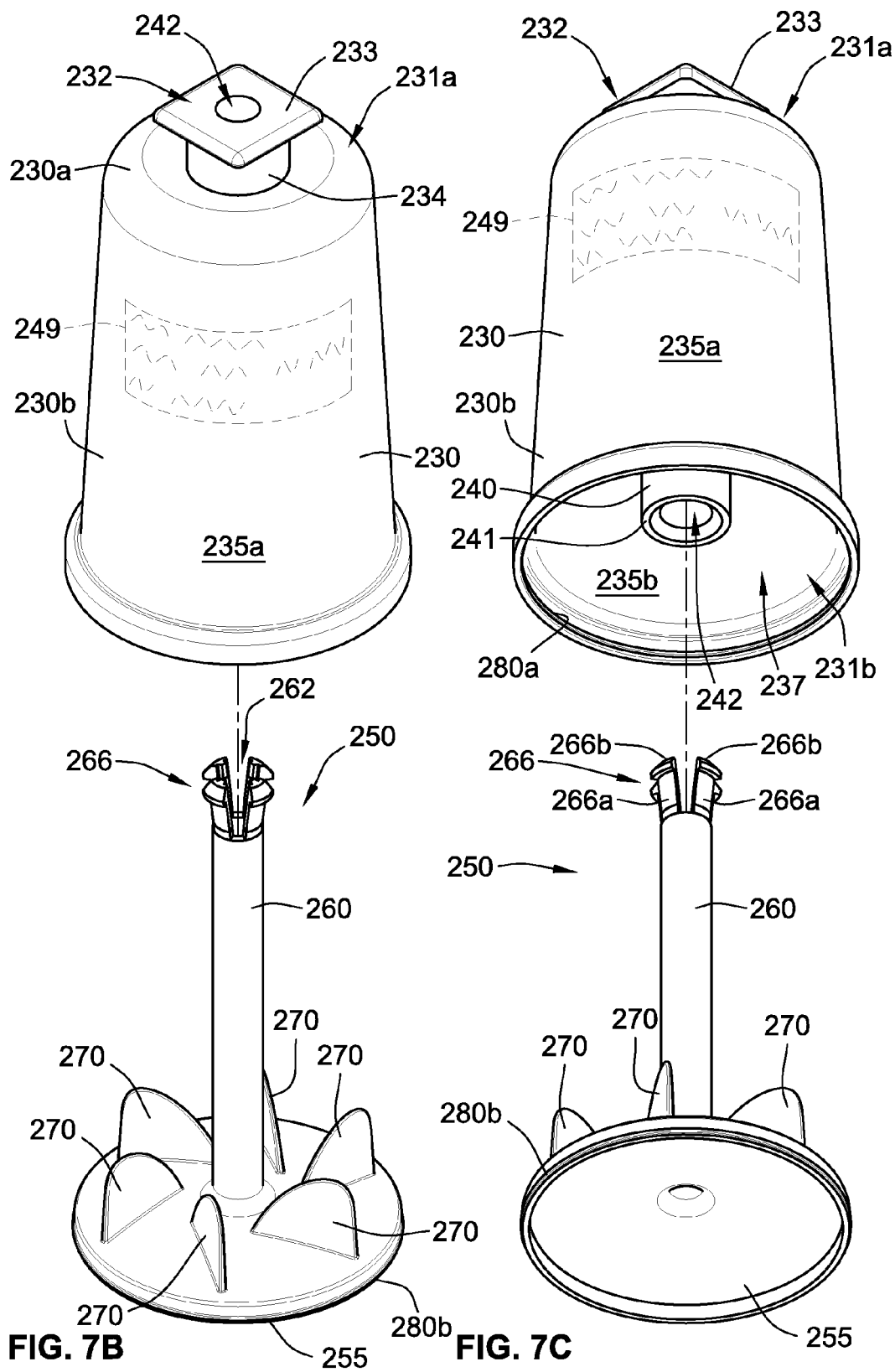
FIG. 7B is an exploded perspective view of the compounding module of FIG. 7A.
FIG. 7C is an exploded perspective view of the compounding module of FIG. 7A.
Figure 7D:
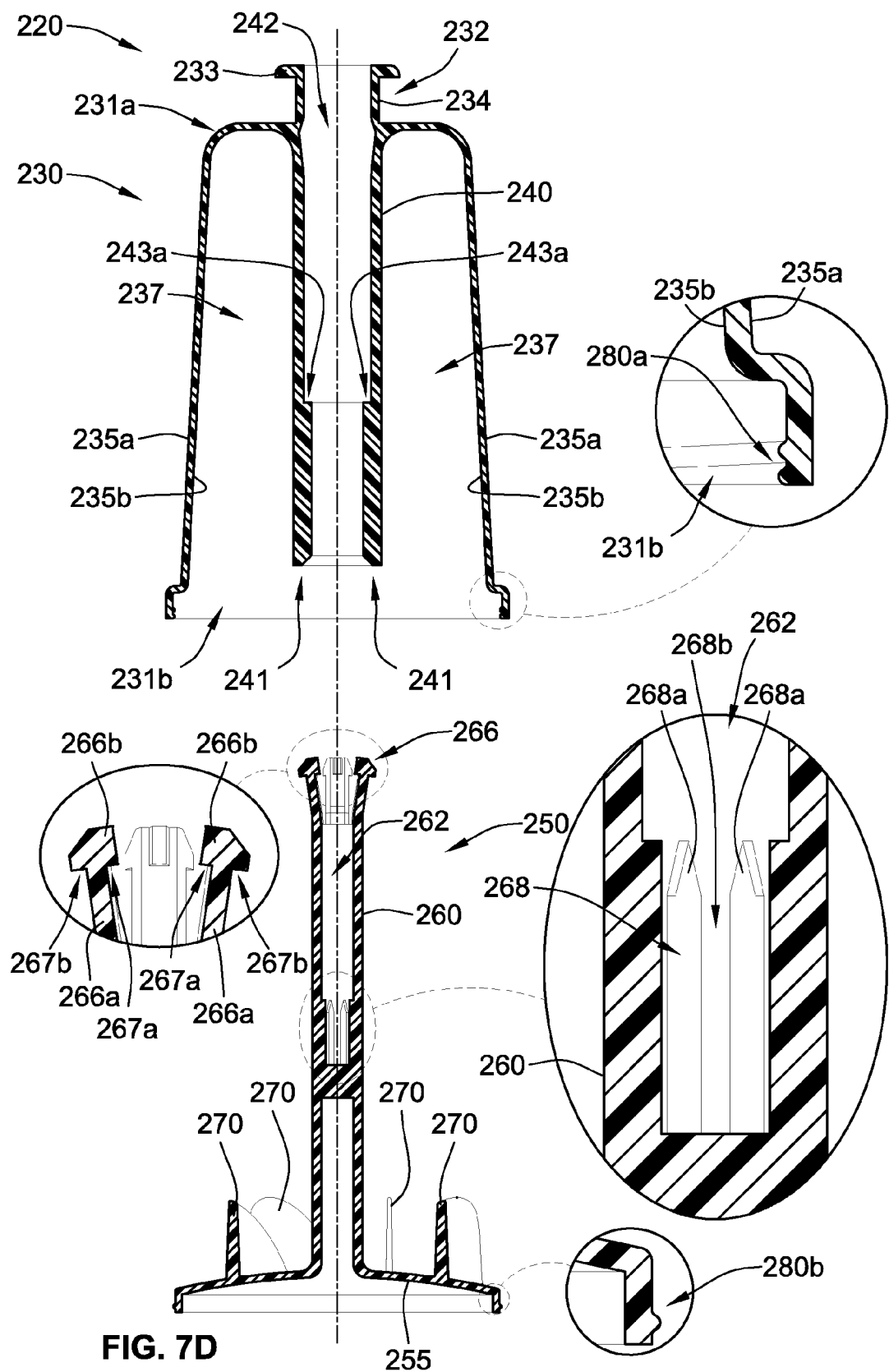
FIG. 7D is an exploded cross-sectional view of the compounding module of FIG. 7A.

Now referring generally to FIGS. 7A-7D, the compounding module 220 is shown and described. The compounding module 220 includes a housing 230 and an agitator 250. The housing 230 has a first end 231a and a second open end 231b (FIGS. 7C and 7D). The second open end 231b separates an outer surface 235a of the housing 230 from an inner surface 235b of the housing 230. The housing 230 includes a lid portion 230a and a side wall portion 230b extending away from the lid portion 230a.

The housing 230 includes a cavity 237 for storing a nutraceutical compound 222 (FIGS. 9B, 10B, and 11B), that is the same as, or similar to, the nutraceutical compound 122, prior to mixing the beverage in the operation position (FIGS. 11A and 11B). The cavity 237 is generally defined by the inner surface 235b of the housing 230 and a portion of the agitator 250. More specifically, as best shown in FIG. 9B, the cavity 237 of the housing 230 is generally defined by (i) an inner surface of the side wall portion 230b of the housing 230, (ii) an inner surface of the lid portion 230a of the housing 230, (iii) an outer surface of a boss 240 (FIG. 7D) of the housing 230, (iv) an inner surface of a base 255 (FIG. 7D) of the agitator 250, and (v) a portion of an outer surface of a shaft 260 of the agitator 250. Further, the inner surface of the side wall portion 230b of the housing 230, (ii) the inner surface of the lid portion 230a of the housing 230, and (iii) the outer surface of the boss 240 of the housing 230 are a contiguous surface.

The housing 230 includes the coupler 232 protruding from the first end 231a of the housing 230. The housing 230 also includes a boss 240 that extends through the housing 230 from the first end 231a towards the second open end 231b (best shown in FIG. 7D). In some implementations, the boss 240, the lid portion 230a, and the side wall portion 230b constitute a monolithic component that is formed, for example, using an injection molding technique. A first end of the boss 240 is integral with the lid portion 230a of the housing 230. The boss 240 defines an inner bore 242 (best shown in FIG. 7D) that extends the entire length of the boss 240 and through the coupler 232 as best shown in FIG. 7D. Part of the outer surface 235a of the housing 230 forms the inner bore 242 of the boss 240. That is, the outer surface 235a of the housing 230 and an inside surface of the inner bore 242 are contiguous like, for example, the outer surface of a Bundt cake pan. The boss 240 includes a terminus or end 241 that points toward the second open end 231b (FIGS. 7C and 7D) of the housing 230. As best shown in FIG. 7D, the terminus 241 can include an angled surface to aid in the initial coupling of the agitator 250 with the boss 240 when assembling the compounding module 220. Specifically, when positioning a shaft 260 of the agitator 250 within the boss 240, the angled surface of the terminus 241 urges outwardly biased deflectable fingers 266a (FIGS. 7C and 7D) of collet 266 inward such that the shaft 260 can be slid into the inner bore 242 of the boss 240 (shown in FIG. 9B).

The housing 230 can include one or more optional module identifiers 249 on the outer surface 235a, the inner surface, 235b, or in-between (i.e., built into the housing 230), that are the same as, or similar to, the optional module identifiers 149 described above in reference to FIGS. 1A-1C.

The agitator 250 of the compounding module 220 has a base 255, the shaft 260, and mixing elements 270. The shaft 260 and mixing elements 270 extend generally perpendicular from the base 255. Each of the mixing elements 270 is in the form of a blades having a fin-like shape; however, any shape for the mixing elements 270 is contemplated (e.g., square shape, triangular shape, semi-circular shape, etc.). Additional, while six blades are shown, any number of blades can be included, such as, for example, one blade, two blades, five blades, ten blades, etc.

As is evident from a comparison of FIGS. 9B, 10B, and 11B, the shaft 260 is slidably coupled to the boss 240 such that the agitator 250 can translate from a sealed position (FIGS. 9A-10B) to an unsealed position (FIGS. 11A and 11B). When the agitator 250 is in the sealed position (FIGS. 9A-10B), a sealing feature 280a,b of the compounding module 220 circumferentially seals the cavity 237 of the housing 230, thereby protecting the nutraceutical compound 222 (FIGS. 9B and 10B) contained therein. The sealing feature 280a,b includes a first sealing feature 280a that is integral with the housing 230 and a second sealing feature 280b that is integral with the base 255. As best shown in FIG. 7D, the first sealing feature 280a includes a groove between two projections at the second open end 231b of the housing 230 and the second sealing feature 280b includes a projection along an outer portion of the base 255 of the agitator 250. As such, when the agitator 250 is in the sealed position (FIGS. 9A-10B), the projection of the second sealing feature 280b on the base 255 engages with the groove of the first sealing feature 280a on the housing 230 to seal the cavity 237.

While the sealing feature 280a,b is shown as include a projection that engages a groove, a variety of alternative sealing features are contemplated to seal the base 255 with the housing 230, such as, for example, the connection described above relative to the base 155 and the housing 130.

The shaft 260 of the agitator 250 includes a translation locking feature or collet 266 and a rotation locking feature 268, which are best shown in FIG. 7D. The rotation locking feature 268 includes a multitude of agitator splines 268a that define a multitude of agitator channels 268b therebetween (FIG. 7D). The collet 266 includes a multitude of deflectable or bendable fingers 266a that are biased at an angle between about one degree and about twenty degrees from vertical (e.g., an axis of the shaft 260).

Each of the fingers 266a includes a hammer head-like member or a locking tab 266b at an end thereof. Each of the locking tabs 266b includes a first portion 267a adjacent to an inner bore 262 of the shaft 260 and a second portion 267b opposing the first portion 267a. The first portions 267a of the locking tabs 266b are sized and shaped to engage with a corresponding translation locking feature 216 (FIGS. 8A and 8B) of the drive shaft 214 in the manner shown in FIGS. 11A and 11B. The second portions 267b of the locking tabs 266b are sized and shaped to engage with a sealing surface 243a (FIG. 7D) of the inner bore 242 of the housing 230 to provide a mechanical seal 290 (FIG. 11B) between the agitator 250 and the boss 240 in the manner shown in FIGS. 11A and 11B. While four deflectable fingers 266a are shown, any number of deflectable fingers 266a can be included in the collet 266 (e.g., two fingers, three fingers, six fingers, etc.). In some alternative implementations, a gasket (not shown) can be included on or near the sealing surface 243a to aid in isolating and/or sealing the drive shaft 214.

Figure 8A:
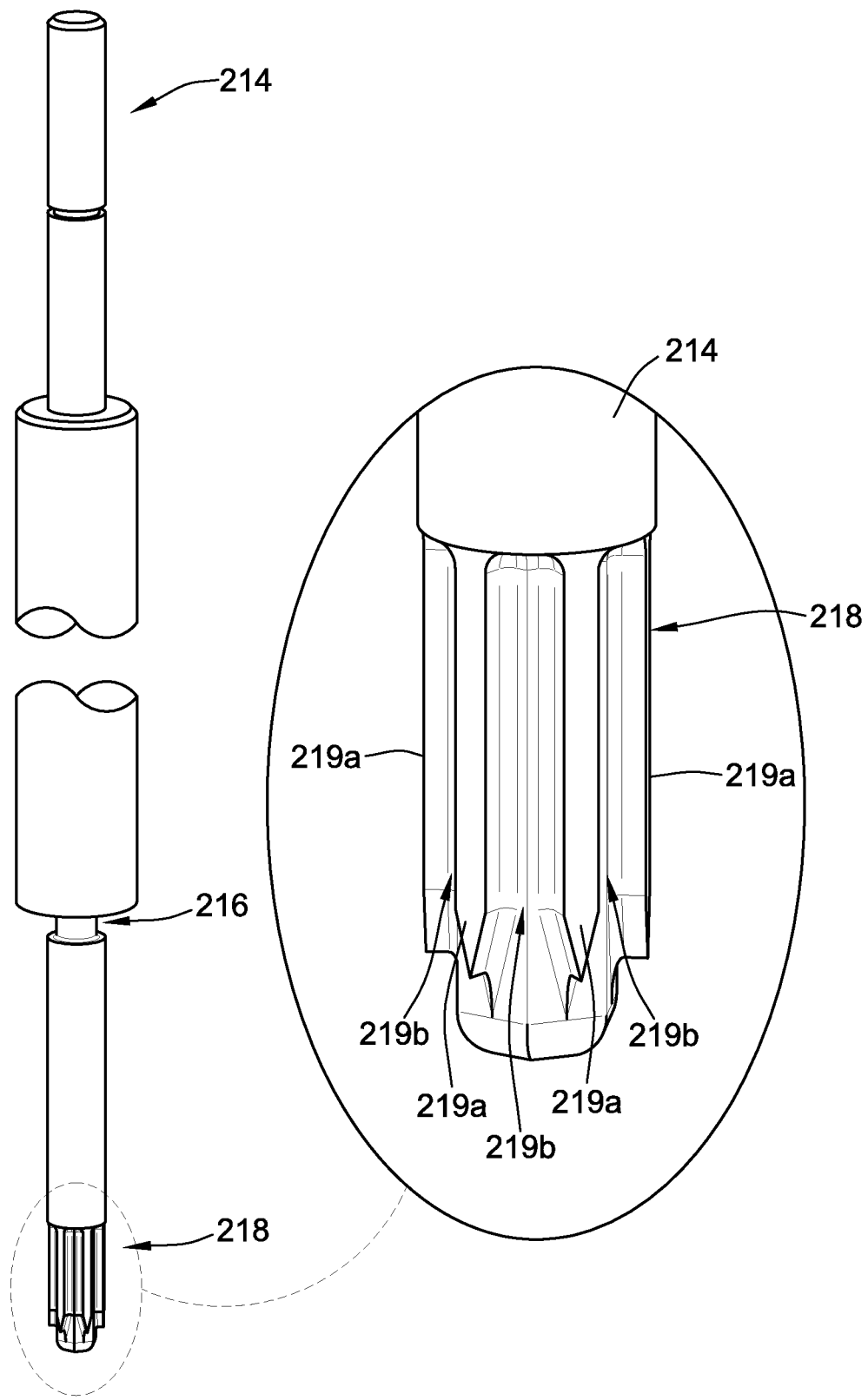
FIG. 8A is a partial perspective view of the drive shaft of the beverage mixing system of FIG. 2.
Figure 8B:
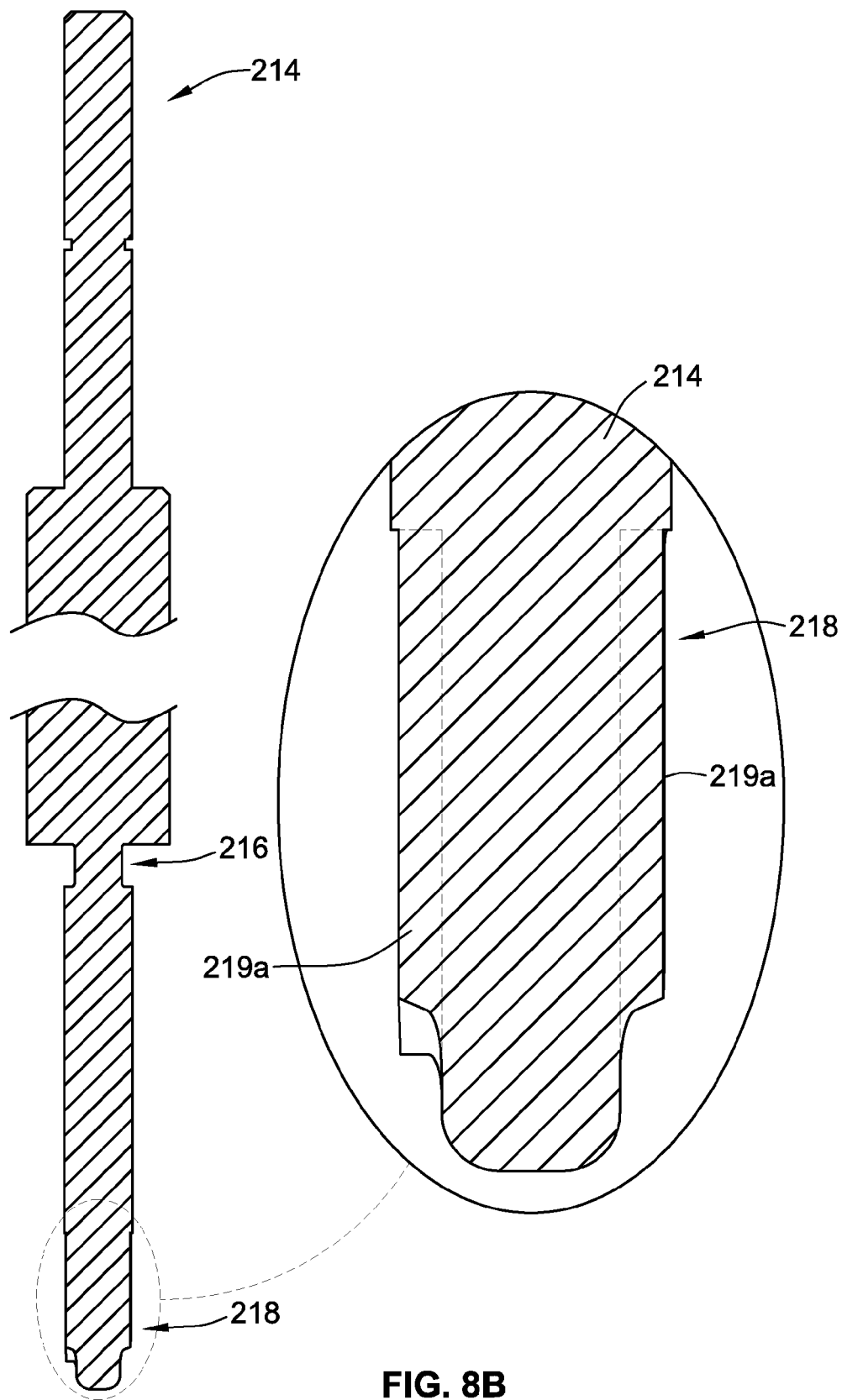
FIG. 8B is a partial cross-sectional view of the drive shaft of FIG. 8A.

Now referring generally to FIGS. 8A and 8B, the drive shaft 214 is shown and described. The drive shaft 214 includes a translation locking feature 216 and a rotation locking feature 218 that are operable to engage with the translation locking feature 266 and the rotation locking feature 268 of the compounding module 220 to lock relative translation and rotation of the drive shaft 214 with the agitator 250 of the compounding module 220. The translation locking feature 216 includes a groove or notch in the drive shaft 214 that is sized and shaped to be engaged by the first portions 267a of the locking tabs 266b as shown in FIG. 11B. The rotation locking feature 218 includes a multitude of drive-shaft splines 219a that define a multitude of drive-shaft channels 219b therebetween (FIG. 8A). The drive-shaft splines 219a are sized and shaped to be received between the multitude of agitator splines 268a and in the multitude of agitator channels 268b in an anti-rotational fashion. That is, the drive-shaft splines 219a engage the agitator splines 268a such that rotation of the drive shaft 214 causes the drive-shaft splines 219a to impart a force of the agitator splines 268a thereby causing the agitator 250 to rotate in a corresponding manner.

A method of engaging the compounding module 220 with the drive shaft 214 during operation of the beverage mixing system 200 is now described in relation generally to FIGS. 9A-11B. Only the compounding module 220 and a portion of the drive shaft 214 are shown for ease of illustration in FIGS. 9A-11B. As shown in FIGS. 9A and 9B, the drive shaft 214 is in the loading position ready to engage the compounding module 220. In this loading position, the sealing feature 280a,b is in the sealed/engaged position and the nutraceutical compound 222 is in the cavity 237 resting on the base 255 around the mixing elements 270. In addition to the sealing feature 280a,b protecting the nutraceutical compound 222 from the outside contaminates in the sealed position (FIG. 9B), the shaft 260 of the agitator 250 can be sized to snugly fit into a lower portion of the inner bore 242 (FIG. 7D) of the boss 240, thereby preventing contaminates and/or moisture from entering the cavity 237 from the inner cavity 242 (FIG. 7D) of the boss 240. Additionally or alternatively, a seal (not shown) can be positioned between the shaft 260 and the boss 240 to aid in sealing the cavity 237.

Also shown in FIG. 9B, the collet 266 is in a relaxed or uncompressed position with the deflectable fingers 266a (FIGS. 7C and 7D) biased outward. To accommodate the deflectable fingers 266a in such a position, the inner bore 242 (FIG. 7D) of the boss 240 includes an outwardly tapered portion at an upper end thereof as best shown in FIG. 9B.

When the drive shaft 214 translates vertically downward from the loading position (FIGS. 9A and 9B) to the engaged position as shown in FIGS. 10A and 10B, the drive shaft 214 engages the shaft 260 of the agitator 250 such that the rotation locking feature 218 (FIG. 8A) of the drive shaft 214 non-rotationally engages the rotation locking feature 268 (FIG. 7D) of the shaft 260 of the agitator 250. Additionally, the collet 266 is positioned to be engaged with the translation locking feature 216. That is, the first portions 267a of the locking tabs 266b are not yet engaged with the translation locking feature 216 of the drive shaft 214.

Figure 12:
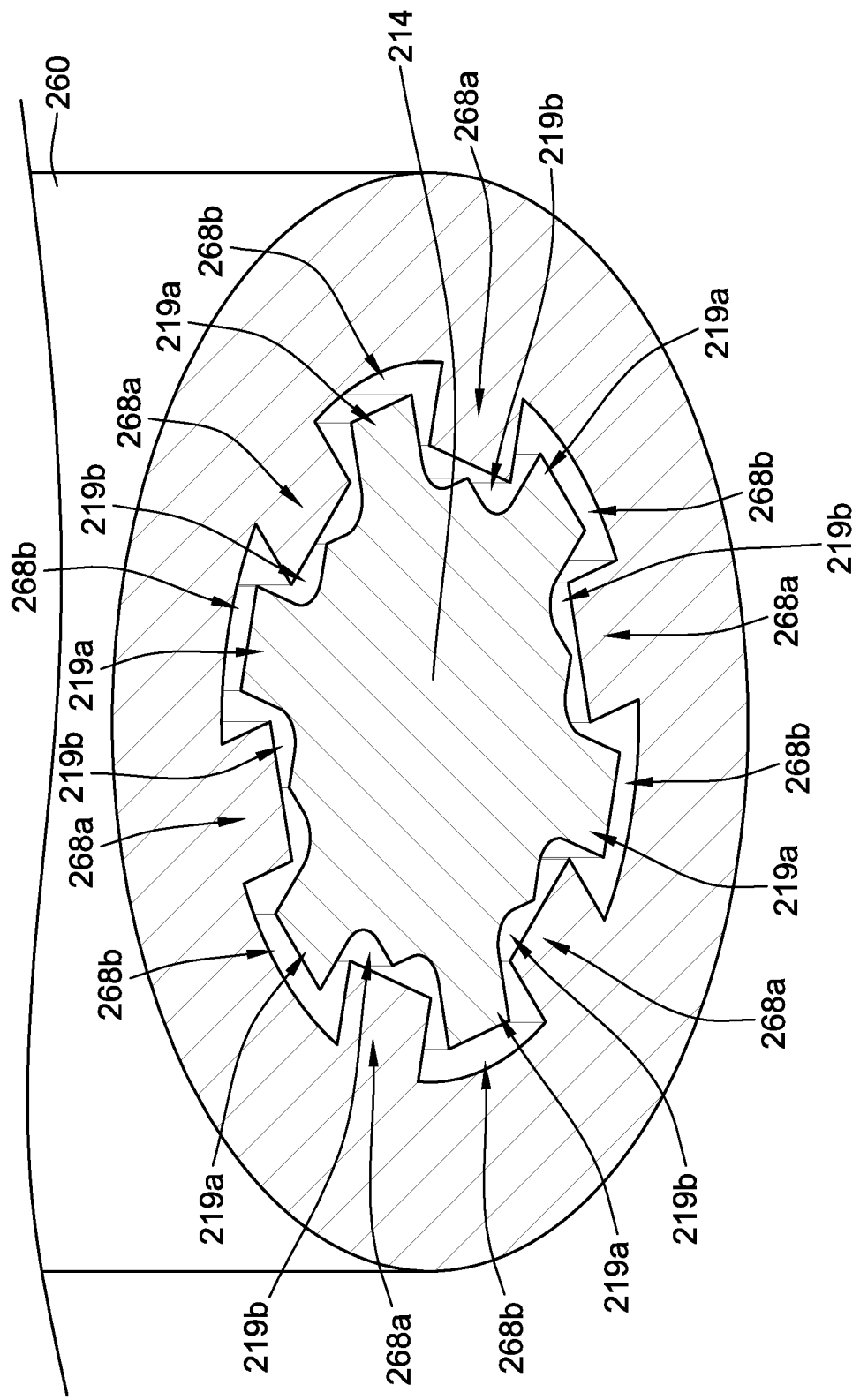
FIG. 12 is cross-sectional view of the drive shaft engaged with the shaft of the agitator of FIG. 11A.

When the drive shaft 214 continues to translate vertically downward from the engaged position (FIGS. 10A and 10B) to the operating position as shown in FIGS. 11A and 11B, the drive shaft remains engaged with the agitator 250 such that the rotation locking feature 218 (FIG. 8A) non-rotationally engages the rotation locking feature 268 (FIG. 7D). A cross-sectional view of the rotation locking feature 218 (FIG. 8A) non-rotationally engaging the rotation locking feature 268 is shown in FIG. 12.

Further, the continued translation of the drive shaft 214 into the operating position also causes the collet 266 to engage with the translation locking feature 216 such that first portions 267a of the locking tabs 266b are engaged with the translation locking feature 216 of the drive shaft 214, thereby locking translational movement of the agitator 250 with the drive shaft 214.

As the translation of the agitator 250 is locked to the drive shaft 214, the continued translation of the drive shaft 214 into the operating position also causes the base 255 to separate from the housing 230, thereby breaking the sealing feature 280a,b and permitting the nutraceutical compound 222 to fall from the cavity 237 and into the vessel 201 (not shown in FIGS. 11A and 11B). With the agitator 250 and the drive shaft 214 in the operating position, the drive shaft 214 can rotate thereby causing the agitator 250 to rotate such that the mixing elements 270 mix the nutraceutical compound 222 with the fluid 202 (FIG. 2) in the vessel 210 (FIG. 2).

Similar to the beverage mixing system 100, during operation of the beverage mixing system 200 (FIGS. 11A and 11B), the drive shaft 214 is isolated from encroachment by the fluid 202 (FIG. 2) and/or the nutraceutical compound 222. That is, while the compounding module 220 relies on the drive shaft 214 to impart rotation and/or translation to the agitator 250, the compounding module protects the drive shaft 214 from becoming contaminated by the fluid 202 (FIG. 2) and/or the nutraceutical compound 222 during the mixing operation (FIGS. 11A and 11B). Specifically, the drive shaft 214 is isolated by a mechanical seal 290 (FIG. 11B) between the inner bore 242 (FIG. 7D) of the boss 240 and the shaft 260 of the agitator 250 that prevents encroachment by the fluid 202 (FIG. 2) and/or the nutraceutical compound 222 into a clean area 243 (FIG. 11B). The clean area 243 is an area between the inner bore 242 and the shaft 260 and that is above the mechanical seal 290. In some implementations, the mechanical seal 290 can occur and/or be aided by, for example, a relatively tight slidable coupling of the boss 240 and the shaft 260 between the collet 266 and the terminus 241 (FIG. 11B). In some implementations, the mechanical seal 290 includes a seal that is separate and distinct from the boss 240 and the shaft 260. For example, the mechanical seal 290 includes a gasket (not shown) positioned between the inner bore 242 and the shaft 260. Regardless of the configuration of the mechanical seal 290, the mechanical seal 290 aids in preventing encroachment of the fluid 202 (FIG. 2) and/or the nutraceutical compound 222 into the clean area 243, which aids in preventing contamination of the drive shaft 214.

Figure 13A:
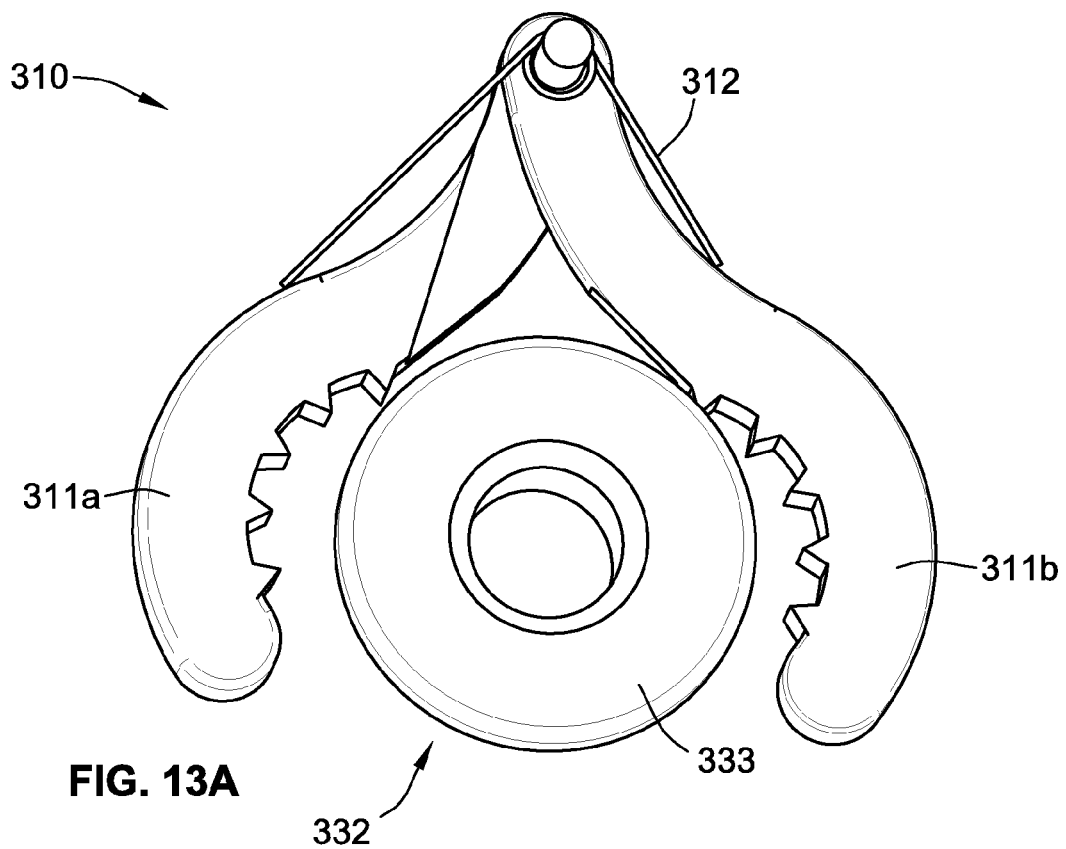
FIG. 13A is a top view of an alternative coupler and coupling mechanism according to some implementations of the present disclosure.
Figure 13B:
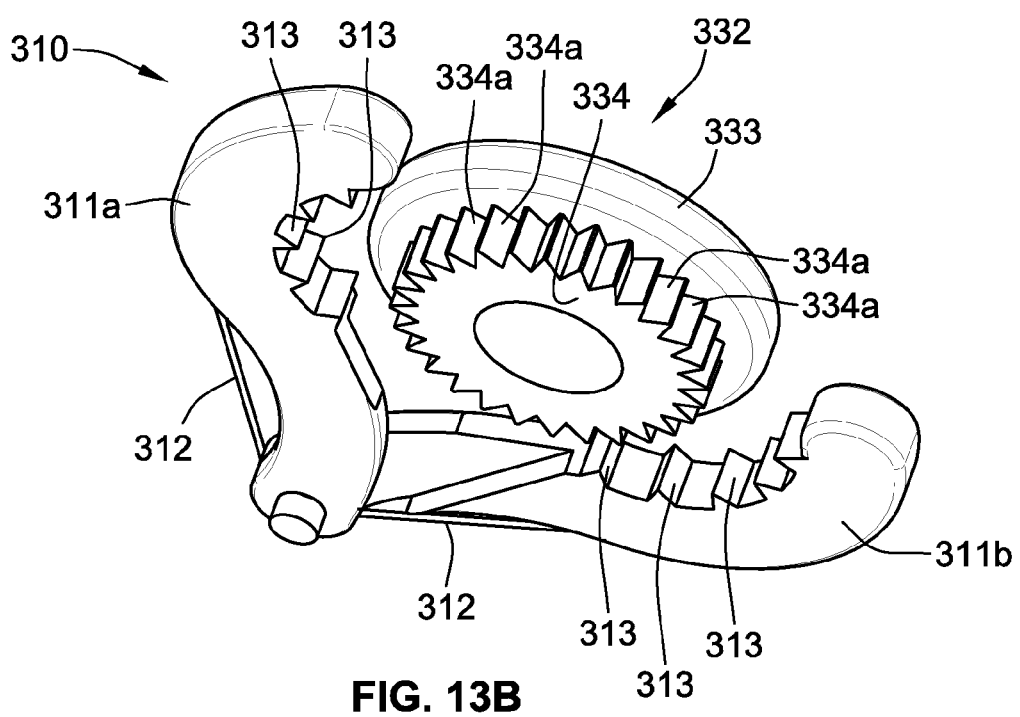
FIG. 13B is a perspective view of the alternative coupler and coupling mechanism of FIG. 13A.
Figure 14:
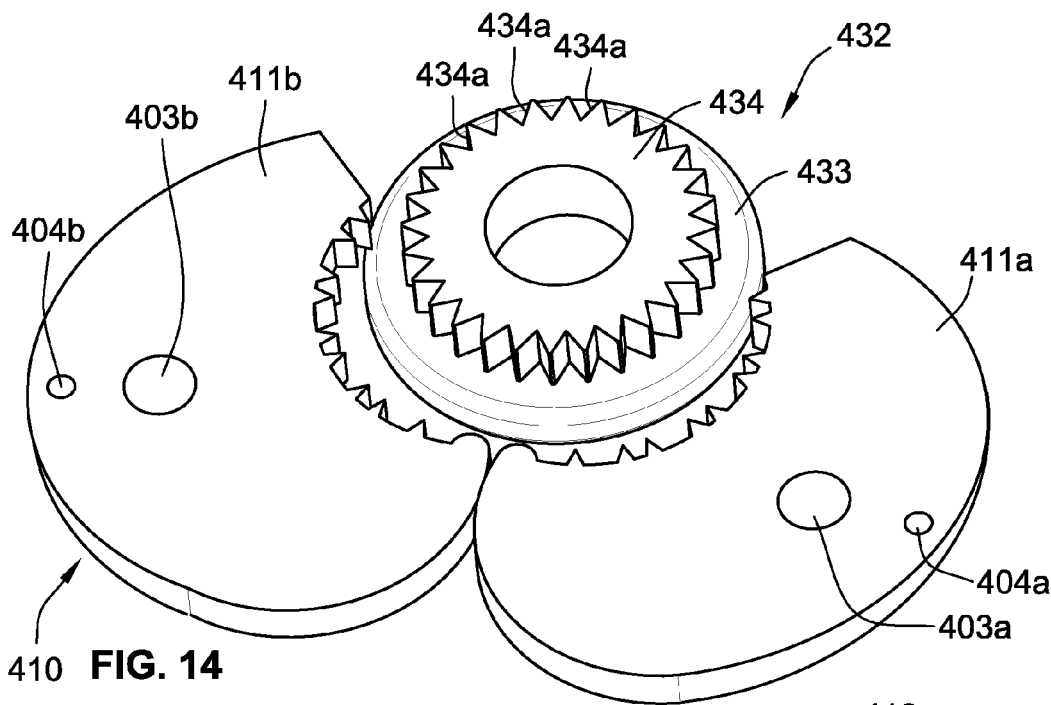
FIG. 14 is a partial perspective view of an alternative coupler and coupling mechanism according to some implementations of the present disclosure.

Now referring to FIGS. 13A and 13B, while the coupling mechanism 210 was shown and described above to mate with the coupler 232 of the compounding module 220, it is contemplated that a variety of alternative couplers can be used with the compounding modules of the present disclosure, and it is further contemplated that corresponding alternative coupling mechanisms can be included in the beverage mixing systems of the present disclosure. For example, as shown in FIGS. 13A and 13B, an alternative coupler 332 has a generally circular head 333 and a generally circular base 334, where the base 334 includes a multitude of teeth 334a or knurling thereon in a gear-like fashion. An alternative coupling mechanism 310 is shown for mating with the alternative coupler 332. The alternative coupling mechanism 310 includes a first arm 311a and a second opposing arm 311b that are biased inward to a closed position by a biasing element 312 (e.g., a spring). Each of the arms 311a,b includes a multitude of teeth 313 that correspond with the teeth or knurling 334a to grab and hold the coupler 332 in a non-rotational fashion. Various additional couplers and coupling mechanisms are possible with the beverage mixing system and compounding modules of the present disclosure.

Now referring to FIGS. 14, and 15A-15C, another example of an alternative coupler and coupling mechanism is shown.

Specifically, an alternative coupler 432 has a generally circular head 433 and a generally circular base 434, where the base 434 includes a multitude of teeth 434a or knurling thereon in a gear-like fashion. An alternative coupling mechanism 410 is shown for mating with the alternative coupler 432. The alternative coupling mechanism 410 includes a yolk 401 having a first leg 402a and a second leg 402b, a first arm 411a rotatably coupled to the first leg 402a via a first pivot pin 403a, and a second arm 411b rotatably coupled to the second leg 402b via a second pivot pin 403b. The first and the second arms 411a, 411b are biased to either a first position (e.g., an open position) shown in FIG. 15A or a second position (e.g., a closed position) shown in FIG. 15C by a biasing element 412 (e.g., a spring) coupled therebetween. Specifically, the biasing element 412 is coupled to the first arm 411a via a first protrusion 404a extending from the first arm 411a and the biasing element 412 is coupled to the second arm 411b via a second protrusion 404b extending from the second arm 411b, although various other methods of coupling the biasing element 412 to the arms 411a, 411b are contemplated.

Figure 15A:
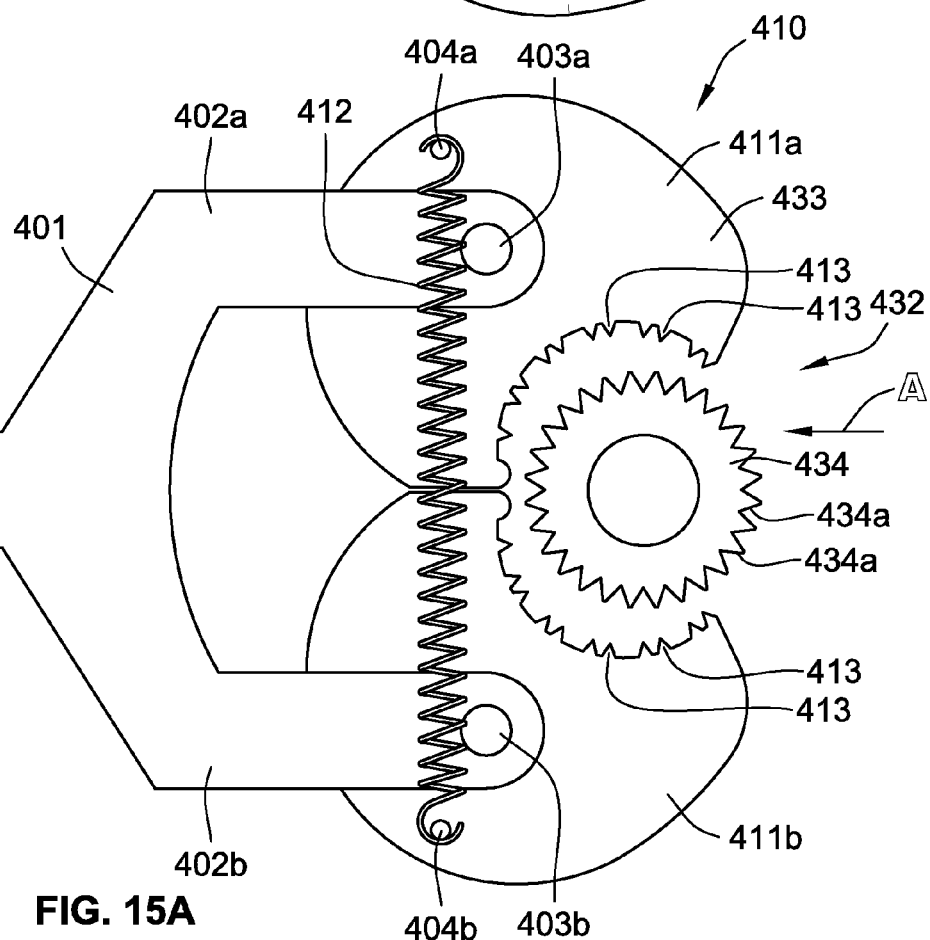
FIG. 15A is a top view of the alternative coupler and coupling mechanism of FIG. 14 in an open position.
Figure 15B:
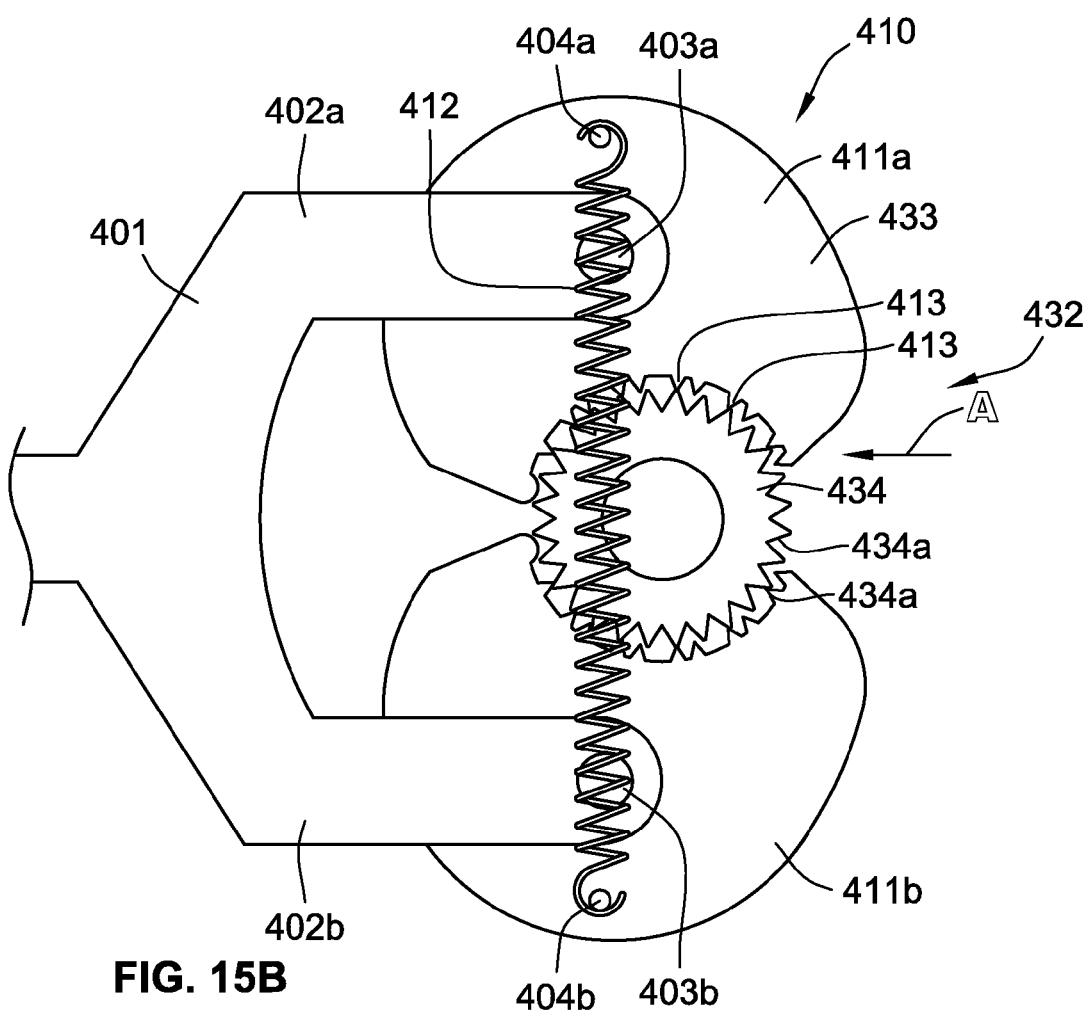
FIG. 15B is a top view of the alternative coupler and coupling mechanism of FIG. 14 in an intermediate position.
Figure 15C:
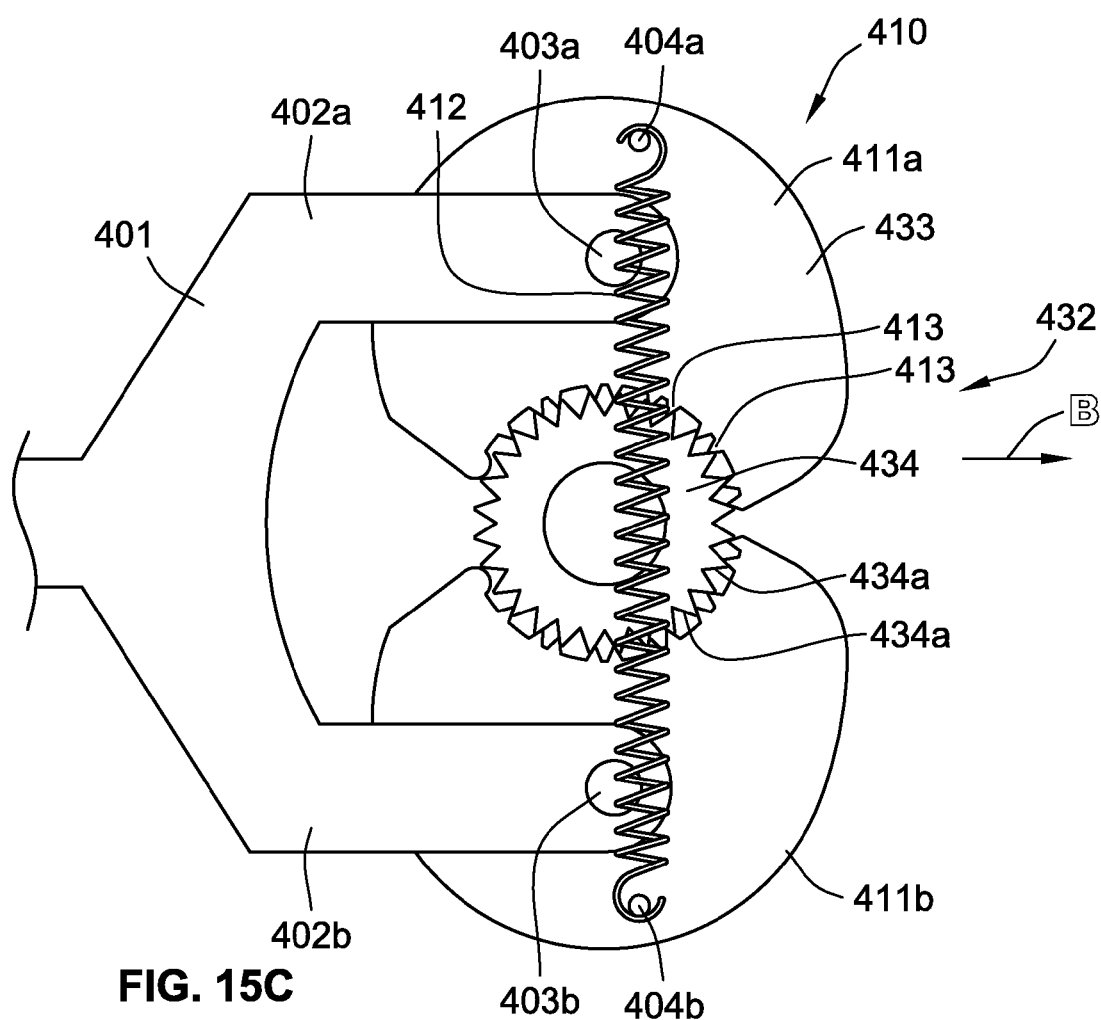
FIG. 15C is a top view of the alternative coupler and coupling mechanism of FIG. 14 in a closed position.
Figure 16A:
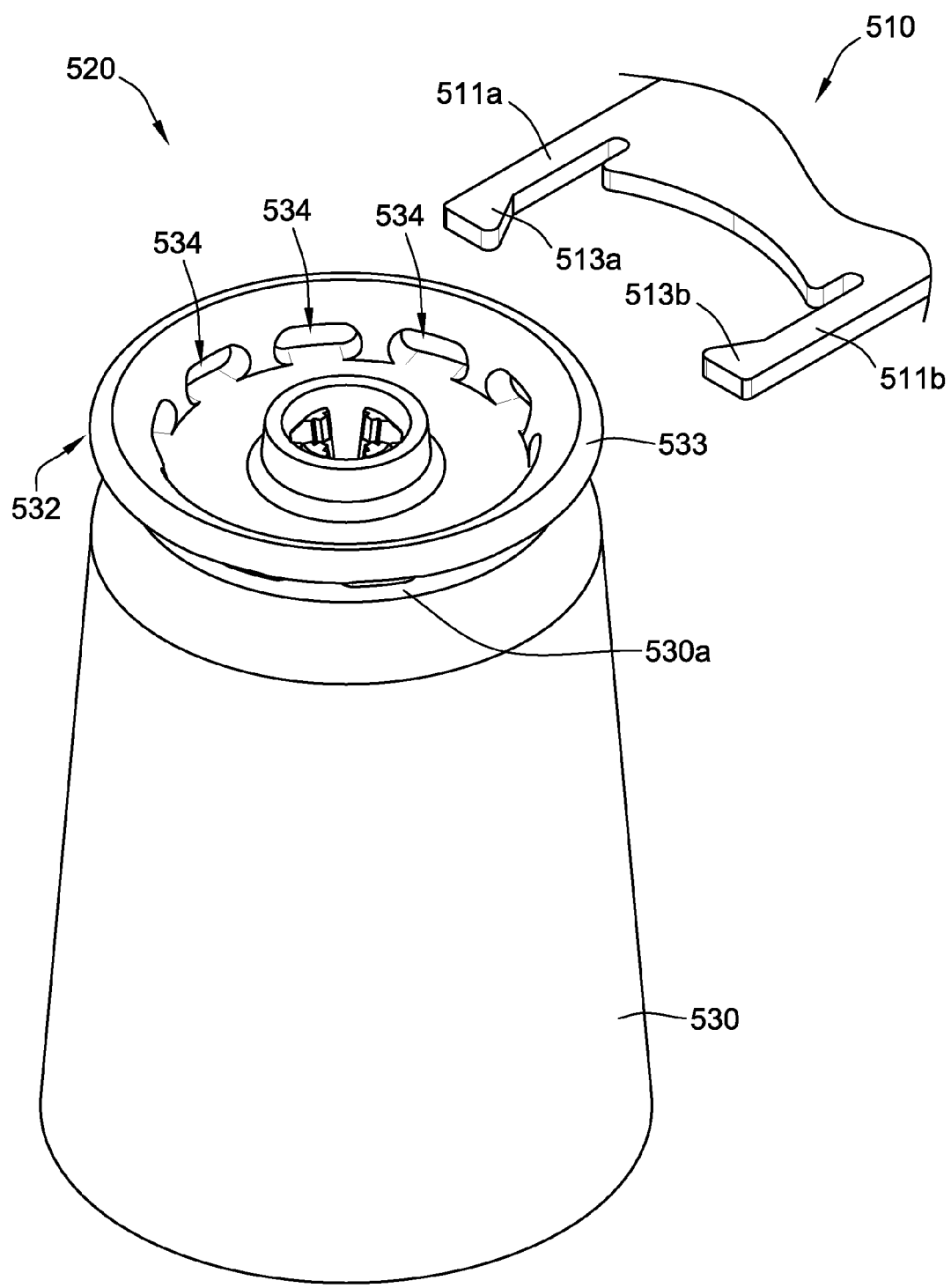
FIG. 16A is an assembled perspective view of an alternative compounding module and an alternative coupling mechanism according to some implementations of the present disclosure.
Figures 16B, 16C:
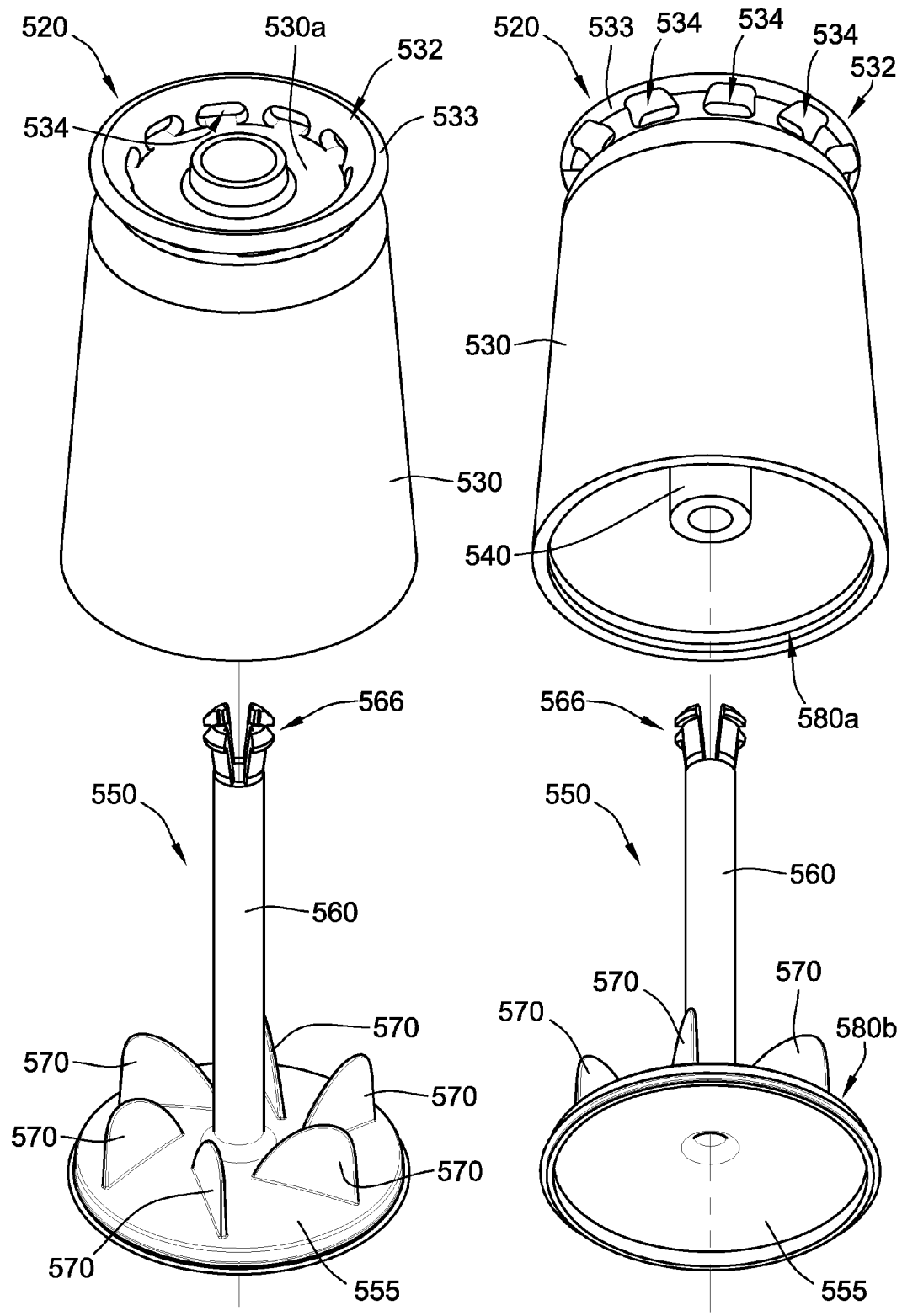
FIG. 16B is an exploded perspective view of the alternative compounding module of FIG. 16A.
FIG. 16C is an exploded perspective view of the alternative compounding module of FIG. 16A.
Figures 16D, 16E:
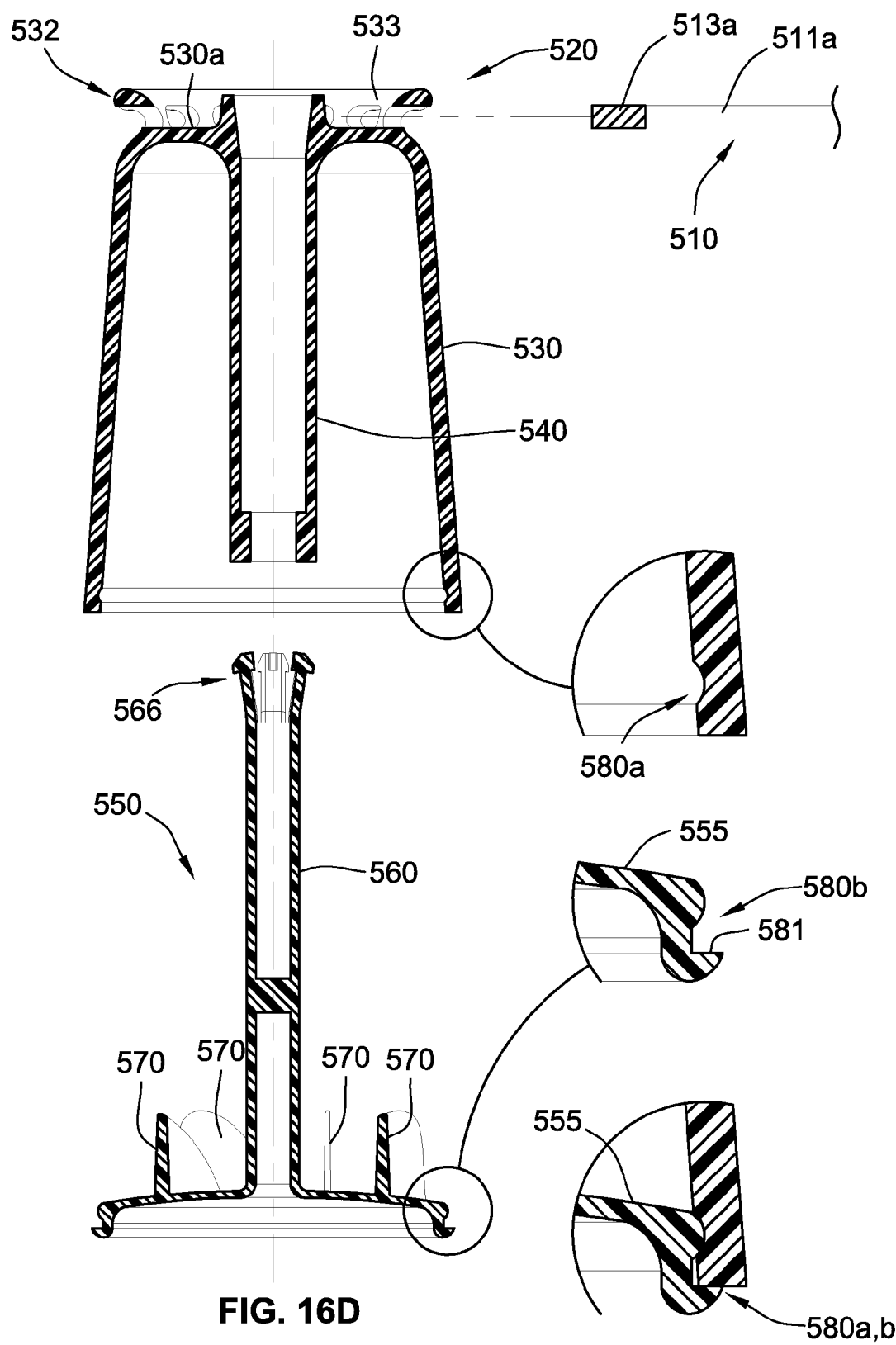
FIG. 16D is an exploded cross-sectional view of the alternative compounding module and the alternative coupling mechanism of FIG. 16A.
FIG. 16E is a partial cross-sectional view of a sealing feature of the alternative compounding module of FIG. 16A.

As shown in FIGS. 15A-15C, depending on the rotational positions of the arms 411a, 441b about the pivot pins 403a,b, the biasing element 412 is configured to bias the arms 411a, 411b into the open position (FIG. 15A) or the closed position 15C). Essentially, the biasing element 412 biases or "snaps" the arms 411a, 411b into one of the first and the second positions (FIG. 15A or 15C). That is, when the arms 411a, 411b are rotated, for example, by being engaged by the coupler 432 moving in the direction of arrow A, the biasing member 412 stretches or extends from its position in FIG. 15A (e.g., resting position) to a maximum extended position in FIG. 15B, where the biasing element 412 and the position of the arms 411a, 411b are unstable. By unstable it is meant that the arms 411a, 411b will not remain in the position shown in FIG. 15B without an external force acting thereon due to the nature of the biasing element 412 acting thereon. Further, continued rotation of the arms 411a, 411b caused by further movement of the coupler 432 in the direction of arrow A causes the biasing member 412 to return to a resting position as shown in FIG. 15C. The arms 411a, 411b can be urged back to the open position (FIG. 15A) by moving the coupler 432 in the direction of arrow B shown in FIG. 15C. Each of the arms 411a,b includes a multitude of teeth 413 that correspond with the teeth or knurling 434a to grab and hold the coupler 432 in a non-rotational fashion. Various additional couplers and coupling mechanisms are possible with the beverage mixing system and compounding modules of the present disclosure.

Now referring to FIGS. 16A-16E, an alternative compounding module 520 is shown relative to a corresponding alternative coupling mechanism 510. The coupling mechanism 510 is similar to the coupling mechanism 210 in that the coupling mechanism 510 is for coupling the compounding module 520 to a beverage mixing system (e.g., beverage mixing system 100, 200) including the coupling mechanism 510. The compounding module 520 is similar to the compounding module 220 in that the compounding module 520 includes a housing 530 and an agitator 550 that are the same as, or similar to, various aspects of the housing 230 and the agitator 250 described herein and shown in the drawings. Further, the housing 530 includes a boss 540 (FIGS. 16C and 16D) that is the same as, or similar to, the boss 240; and the agitator 550 includes a base 555 (best shown in FIG. 16B), a shaft 560, a collet 566 and mixing element 570, that are the same as, or similar to, the base 255, the shaft 260, the collet 266, and the mixing elements 270, respectively. However, several differences exist between the compounding module 520 and the compounding module 220.

Specifically, for example, the compounding module 520 includes coupler 532 that is different than the coupler 232 of the compounding module 220. The coupler 532 of the compounding module 520 has a generally circular head 533 that forms a multitude of insertion holes 534 between a lid portion 530a of the housing 530 and the head 533 of the coupler 532. The insertion holes 534 are positioned around the coupler 532 for mating with the coupling mechanism 510 in a snap-in type engagement. Specifically, to load the compounding module 520 into the coupling mechanism 510, a user moves the compounding module 520 in a generally horizontal fashion (with respect to the orientation portrayed in FIG. 16D) toward the coupling mechanism 510 with the insertion holes 534 generally aligned with protrusions 513a,b of two arms 511a,b (FIG. 16A) of the coupling mechanism 510. To remove the compounding module 520, the user just pulls the compounding module 520 in an opposite direction away from the arms 511a,b, which will cause the arms 511a,b to move apart, thereby allowing for removal of the compounding module 520. To accommodate such a process, the arms 511a,b have a certain degree of flexibility and memory, similar to a leaf spring.

Another difference between the compounding module 520 and the compounding module 220 is that a sealing feature 580a,b (best shown in FIGS. 16D and 16E) of the compounding module 520 has a different configuration than the sealing feature 280a,b. Specifically, for example, the sealing feature 580b of the agitator 550 includes a lip 581 that acts as a positive stop to aid in preventing over installation and/or over insertion of the agitator 550 into the housing 530, thereby preventing and/or reducing the possibility of encroachment of the agitator 550 into a cavity 537 of the housing 530.

Now referring to FIGS. 17A-17D, an alternative compounding module 620 is shown relative to a corresponding alternative coupling mechanism 610. The coupling mechanism 610 is similar to the coupling mechanism 210 in that the coupling mechanism 610 is for coupling the compounding module 620 to a beverage mixing system (e.g., beverage mixing system 100, 200) including the coupling mechanism 610. The compounding module 620 is similar to the compounding module 220 in that the compounding module 620 includes a housing 630 and an agitator 650 that are the same as, or similar to, various aspects of the housing 230 and the agitator 250 described herein and shown in the drawings. Further, the agitator 650 includes a base 655 (best shown in FIG. 17B), a shaft 660, a collet 666 and mixing element 670, that are the same as, or similar to, the base 255, the shaft 260, the collet 266, and the mixing elements 270, respectively. However, several differences exist between the compounding module 620 and the compounding module 220.

Specifically, for example, while the compounding module 220 includes a coupler 232 and a boss 240 that are shown as being integral with the rest of the housing 230, the compounding module 620 includes a coupler/boss element 625 (FIGS. 17B, 17C, and 17D) that is separate and distinct from the rest of the housing 630. By separate and distinct, it is meant that the coupler/boss element 625 is formed separately from the housing 630 and then is coupled thereto via, for example, a snap-in connection, a click-in connection, a press-fit connection, a glue connection, a welded connection, etc., or any combination thereof.

The coupler/boss element 625 includes a coupler portion 632 coupled to a boss portion 640. The boss portion 640 includes a notch or an undercut 641 that mates with a projection 631 (FIG. 17D) of the housing 630 when the coupler/boss element 625 is installed and/or coupled to the housing 630 during fabrication of the compounding module 620. In some implementations, the projection 631 is an annular projection that circumscribes a complete circle. In other implementations, the projection 631 includes a plurality of projections or fingers that engage the notch 641. While the coupler/boss element 625 is formed as a separate and distinct component of the housing 630, when the coupler/boss element 625 is coupled to the housing 630 as shown in, for example, FIG. 17A, the boss portion 640 functions in the same, or similar, manner as the boss 240.

Figure 17A:
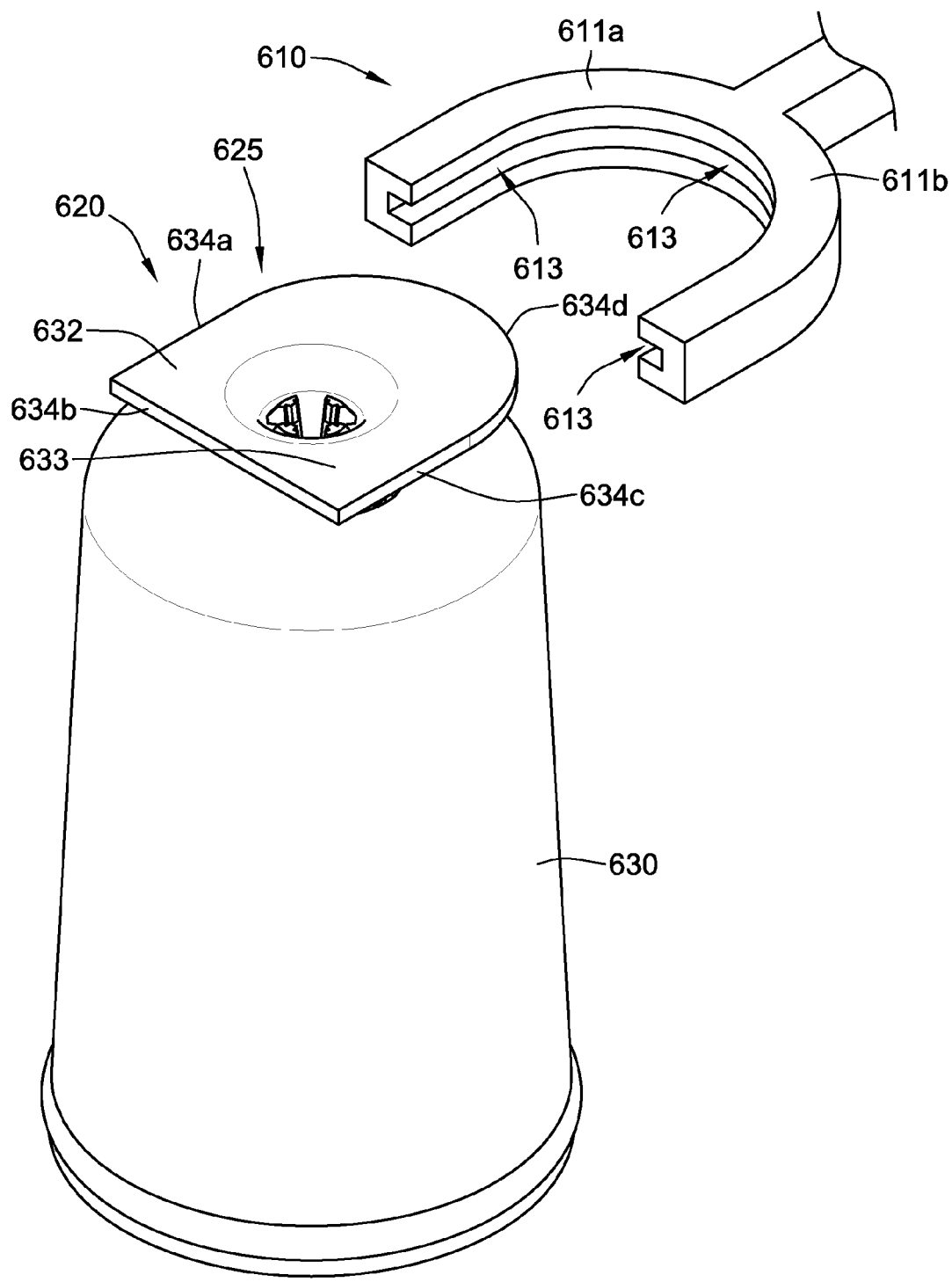
FIG. 17A is an assembled perspective view of an alternative compounding module and an alternative coupling mechanism according to some implementations of the present disclosure.

The coupler portion 632 of the compounding module 620 has a head 633 with three generally straight edges 634*a,b,c* and one generally curved edge 634*d* (FIG. 17A). The head 633 is sized and shaped for mating with the coupling mechanism 610 in a slide-in type engagement. Specifically, to load the compounding module 620 into the coupling mechanism 610, a user moves the compounding module 620 in a generally horizontal fashion (with respect to the orientation portrayed in the FIG. 17A) toward the coupling mechanism 610 with the head 633 generally aligned with groove 613 formed in two arms 611*a,b* (FIG. 17A) of the coupling mechanism 610 and with the curved edge 634*d* leading (e.g., closest to the coupling mechanism 610 as shown in FIG. 17A). To remove the compounding module 620, the user slides and/or pulls the compounding module 620 in an opposite direction away from the arms 611*a,b*. While not shown in FIG. 17A, the coupling mechanism 610 can include a locking mechanism that temporarily locks the head 633 of the coupler 632 in the groove 613, such as, for example, one or more locking tabs or the like. Alternatively or additionally, the arms 611*a,b* and/or the groove 613 can be sized and shaped such that the head 633 is press fit (e.g., lightly press fit) into the groove 613, thereby rigidly holding the head 633 in the groove 613 and requiring a pulling force (e.g., a light pulling force) to remove the head 633 therefrom.

Figure 17D:
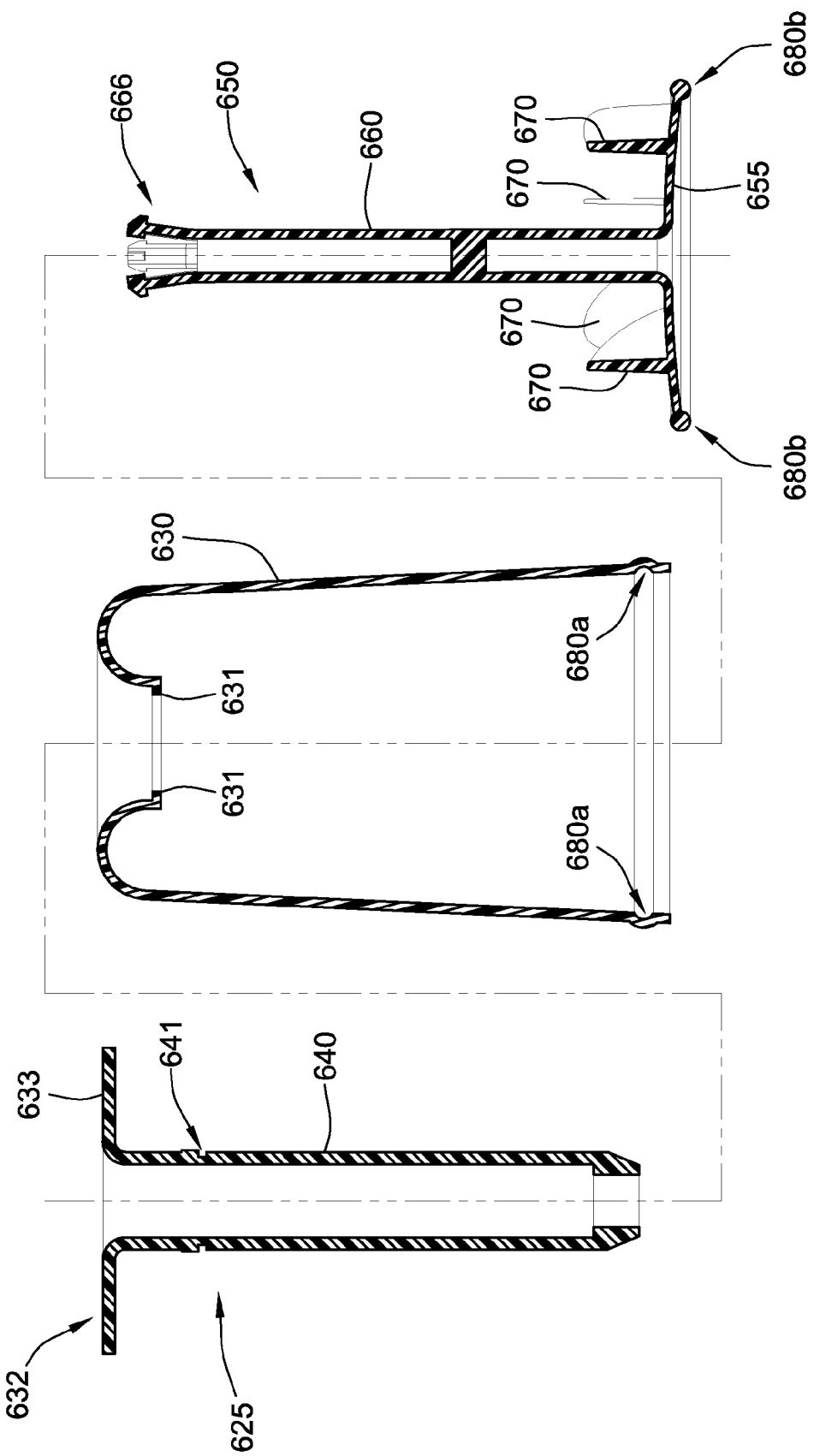
FIG. 17D is an exploded cross-sectional view of the alternative compounding module and the alternative coupling mechanism of FIG. 17A.

Another difference between the compounding module 220 and the compounding module 620 is that a sealing feature 680*a,b* (best shown in FIG. 17D) of the compounding module 620 has a different configuration than the sealing feature 280*a,b*, as is evident by a comparison of FIG. 7D (sealing feature 280*a,b*) with FIG. 17D (sealing feature 680*a,b*).

Figure 18A:
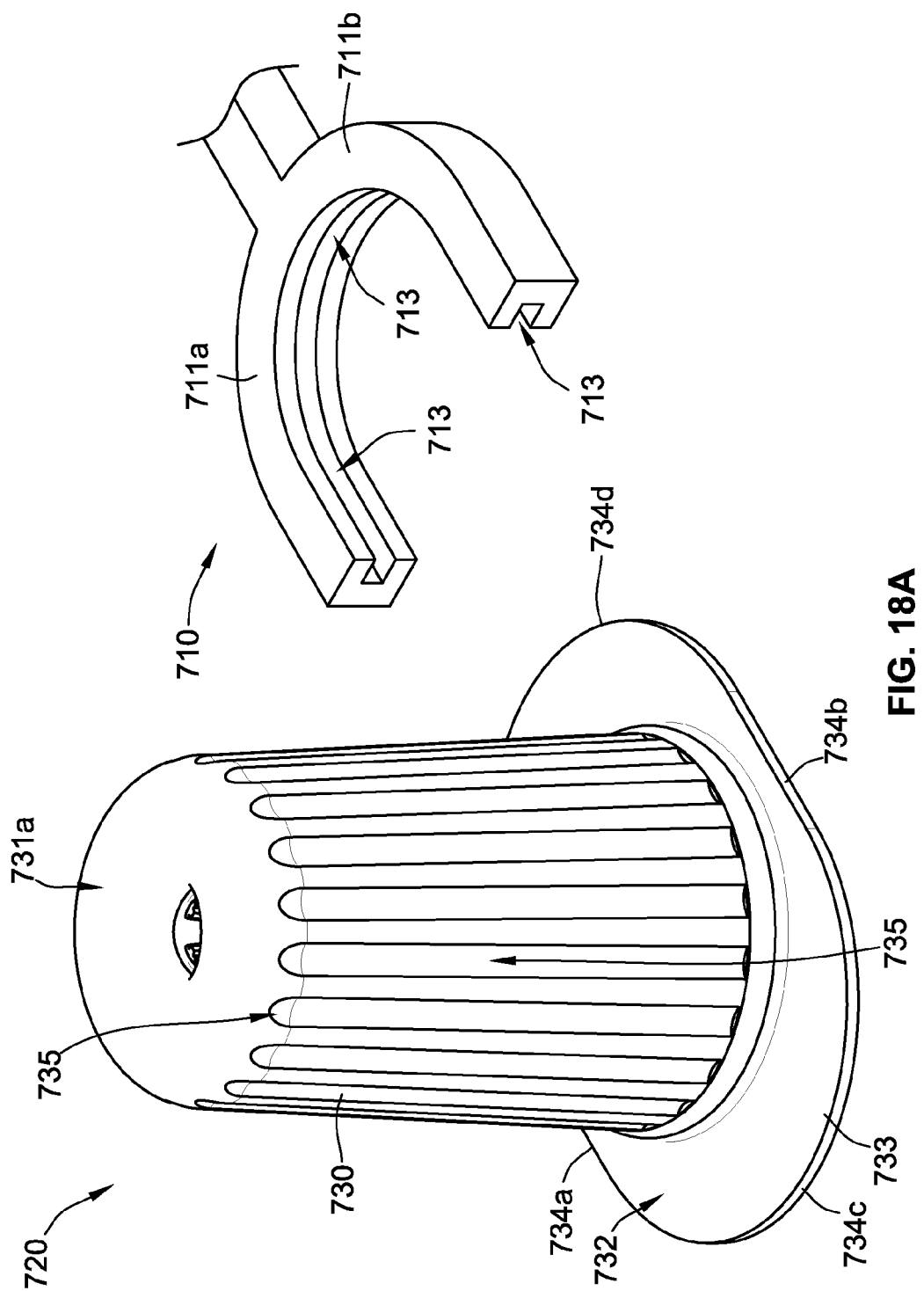
FIG. 18A is an assembled perspective view of an alternative compounding module and an alternative coupling mechanism according to some implementations of the present disclosure.
Figures 18B, 18C:
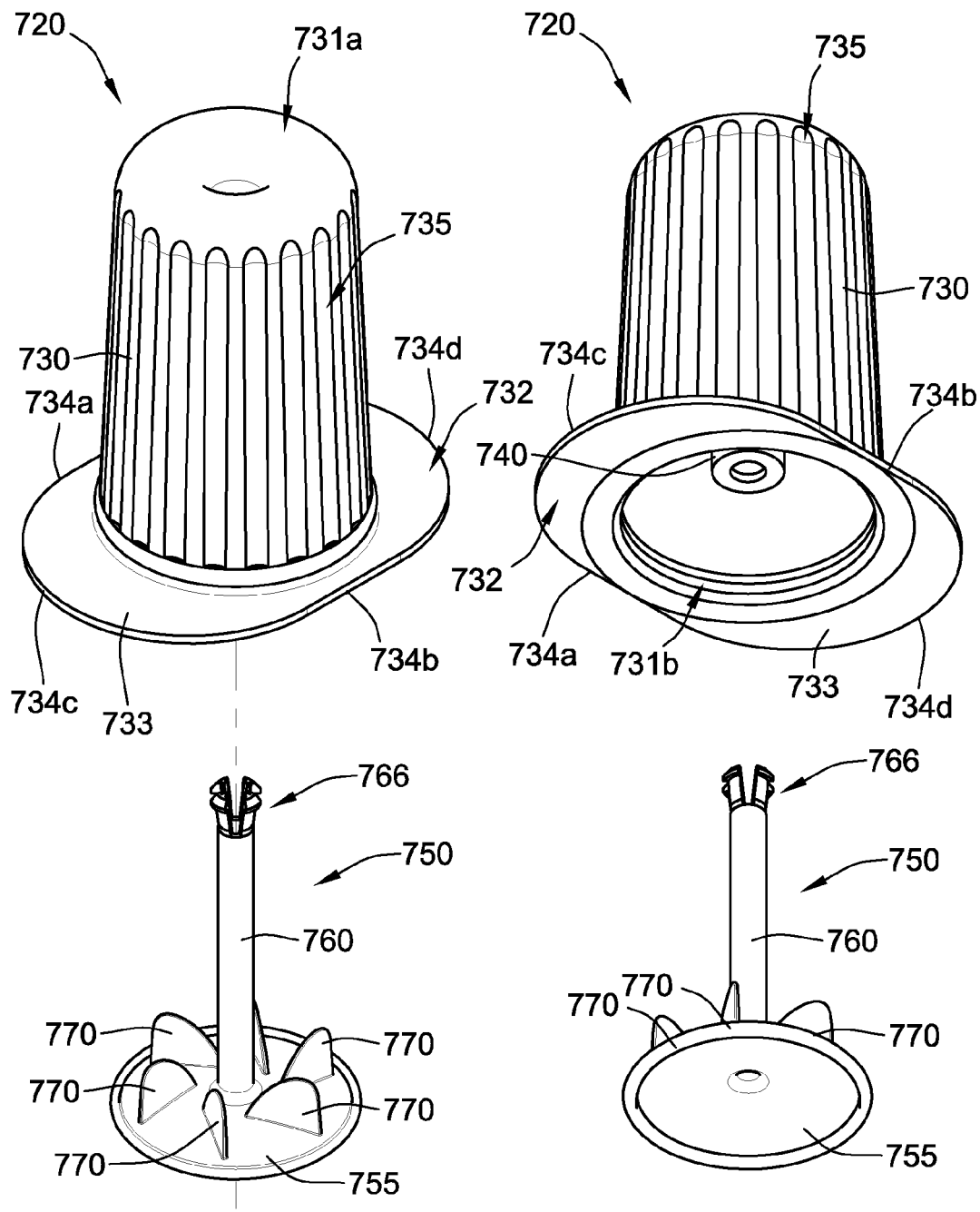
FIG. 18B is an exploded perspective view of the alternative compounding module of FIG. 18A.
FIG. 18C is an exploded perspective view of the alternative compounding module of FIG. 18A.

Now referring to FIGS. 18A-18E, an alternative compounding module 720 is shown relative to a corresponding alternative coupling mechanism 710 (FIG. 18A). The coupling mechanism 710 is the same as, or similar to, the coupling mechanism 610. The compounding module 720 is similar to the compounding module 220 in that the compounding module 720 includes a housing 730 and an agitator 750 that are the same as, or similar to, various aspects of the housing 230 and the agitator 250 described herein and shown in the drawings. Further, the housing 730 includes a boss 740 (FIGS. 18C and 18D) that is the same as, or similar to, the boss 240; and the agitator 750 includes a base 755 (best shown in FIG. 18B), a shaft 760, a collet 766 and mixing element 770, that are the same as, or similar to, the base 255, the shaft 260, the collet 266, and the mixing elements 270, respectively. However, several differences exist between the compounding module 720 and the compounding module 220.

Specifically, for example, the compounding module 720 includes coupler 732 that is different than the coupler 232 of the compounding module 220 in that the coupler 732 of the compounding module 720 is positioned at a second open end 731*b* (FIGS. 18C and 18D) of the housing 730 and not at a first end 731*a*, and in that the coupler 732 has a head 733 with two generally straight edges 734*a,b* and two generally curved edges 734*c,d*. The head 733 is sized and shaped for mating with the coupling mechanism 710 in a slide-in type engagement. Specifically, to load the compounding module 720 into the coupling mechanism 710, a user moves the compounding module 720 in a generally horizontal fashion (with respect to the orientation portrayed in the drawings) toward the coupling mechanism 710 with the head 733 generally aligned with groove 713 formed in two arms 711*a,b* (FIG. 18A) of the coupling mechanism 710 and with one of the two curved edges 734*c,d* leading (e.g., closest to the coupling mechanism 710 as shown in FIG. 18A). To remove the compounding module 720, the user just pulls the compounding module 720 in an opposite direction away from the arms 711*a,b*.

Another difference between the compounding module 720 and the compounding module 220 is that a sealing feature 780*a,b* (best shown in FIGS. 18D and 18E) of the compounding module 720 has a different configuration than the sealing feature 280*a,b*, as evident by a comparison of FIG. 7D (sealing feature 280*a,b*) with FIGS. 18D and 18E (sealing feature 780*a,b*).

Another difference between the compounding module 720 and the compounding module 220 is that the housing 730 includes a multitude of grooves 735 (FIGS. 18A, 18B, and 18C) formed in an exterior surface of the housing 730 as compared to the generally flat exterior surface of the housing 230 of the compounding module 220. The grooves 735 can aid in adding rigidity to the housing 730 and/or aid in the automatic removal of a nutraceutical compound (not shown) contained within the housing 730, for example, when the agitator 750 is separated and lowered from the housing 730.

Now referring to FIGS. 19A-19D, an alternative compounding module 820 is shown relative to a corresponding alternative coupling mechanism 810. The coupling mechanism 810 is similar to the coupling mechanism 210 in that the coupling mechanism 810 is for coupling the compounding module 820 to a beverage mixing system (e.g., beverage mixing system 100, 200) including the coupling mechanism 810. The compounding module 820 is similar to the compounding module 220 in that the compounding module 820 includes a housing 830 and an agitator 850 that are the same as, or similar to, various aspects of the housing 230 and the agitator 250 described herein and shown in the drawings. Further, the housing 830 includes a boss 840 (FIGS. 19C and 19D) that is the same as, or similar to, the boss 240; and the agitator 850 includes a base 855 (best shown in FIG. 19D), a shaft 860, a collet 866 and mixing element 870, that are the same as, or similar to, the base 255, the shaft 260, the collet 266, and the mixing elements 270, respectively. However, several differences exist between the compounding module 820 and the compounding module 220.

Specifically, for example, the compounding module 820 includes coupler 832 that is different than the coupler 232 of the compounding module 220 in that the coupler 832 of the compounding module 820 is positioned at a second open end 831*b* of the housing 830 and not at a first end 831*a*. Further, the coupler 832 has a head 833 with a multitude of teeth 834. The head 833 and the teeth 834 thereon are sized and shaped for mating with the coupling mechanism 810 in an automatic drop-in type engagement. Specifically, to load the compounding module 820 into the coupling mechanism 810, a user positions the compounding module 820 above biased locking tabs 811*a,b* (the same as, or similar to, biased locking tabs 211*a,b*). Then the user drops and/or moves the compounding module 820 in a generally vertical-downward fashion (with respect to the orientation portrayed in the drawings) toward the coupling mechanism 810 with the teeth 834 of the coupler 832 generally aligned with teeth 813 formed in a ring 811 of the coupling mechanism 810. Such a movement of the compounding module 820 causes the head 833 and/or the teeth 834 to engage the biased locking tabs 811*a,b* and move the biased locking tabs 811*a,b* horizontally outward, thereby allowing the head 833 to move vertically downward past the biased locking tabs 811*a,b*. After clearing the biased locking tabs 811*a,b*, the teeth 834 engage the teeth 813 in an antirotational fashion and the biased locking tabs 811*a,b* return to their biased home position locking the compounding module 820 in its vertical position (not shown). To remove the compounding module 820, the user manually separates the biased locking tabs 811*a,b*, such as, for example, by pressing a button (not shown) and then lifts the compounding module 820 in a generally upward direction away from the ring 811.

Figure 19A:
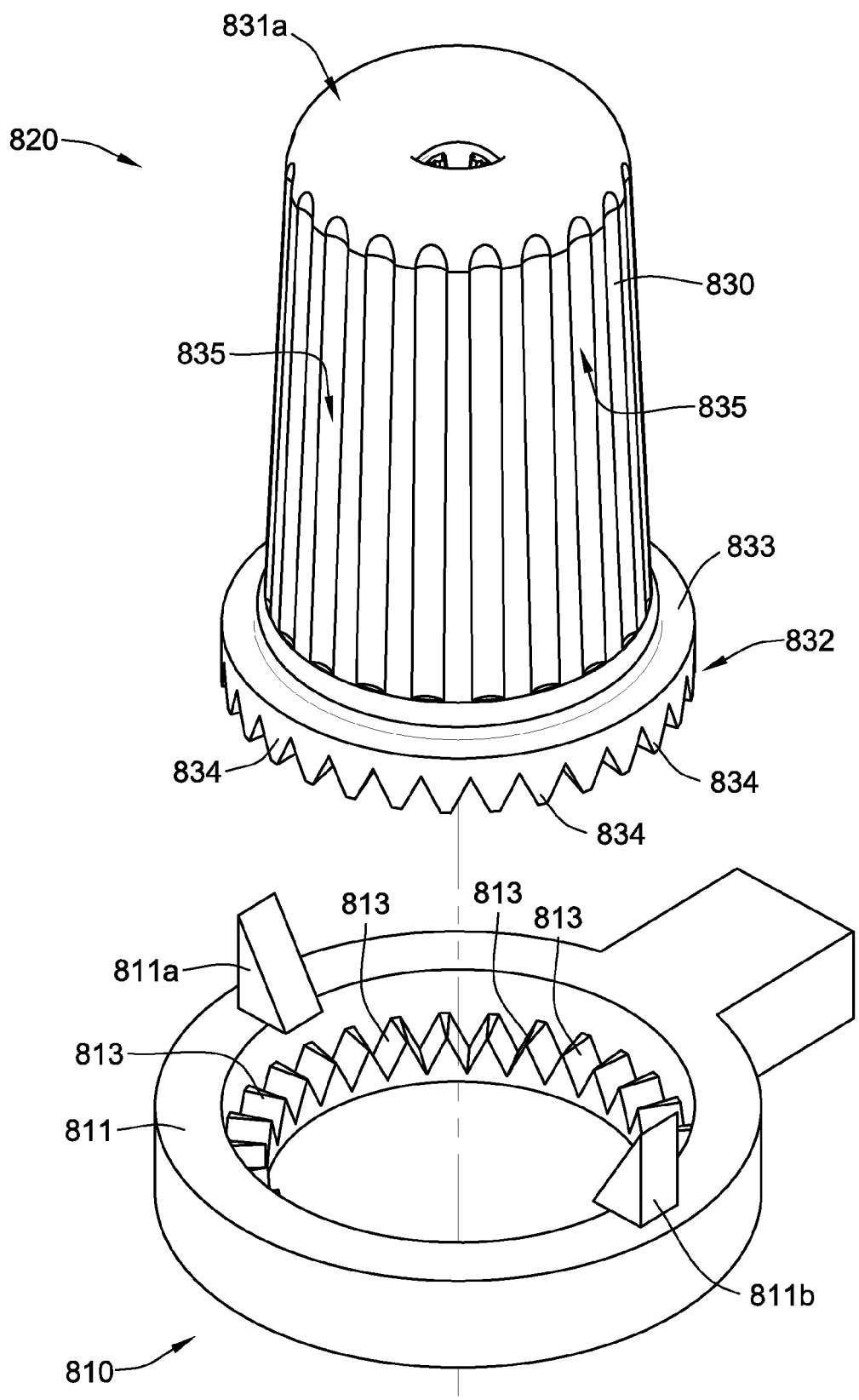
FIG. 19A is an assembled perspective view of an alternative compounding module and an alternative coupling mechanism according to some implementations of the present disclosure.
Figure 19B:
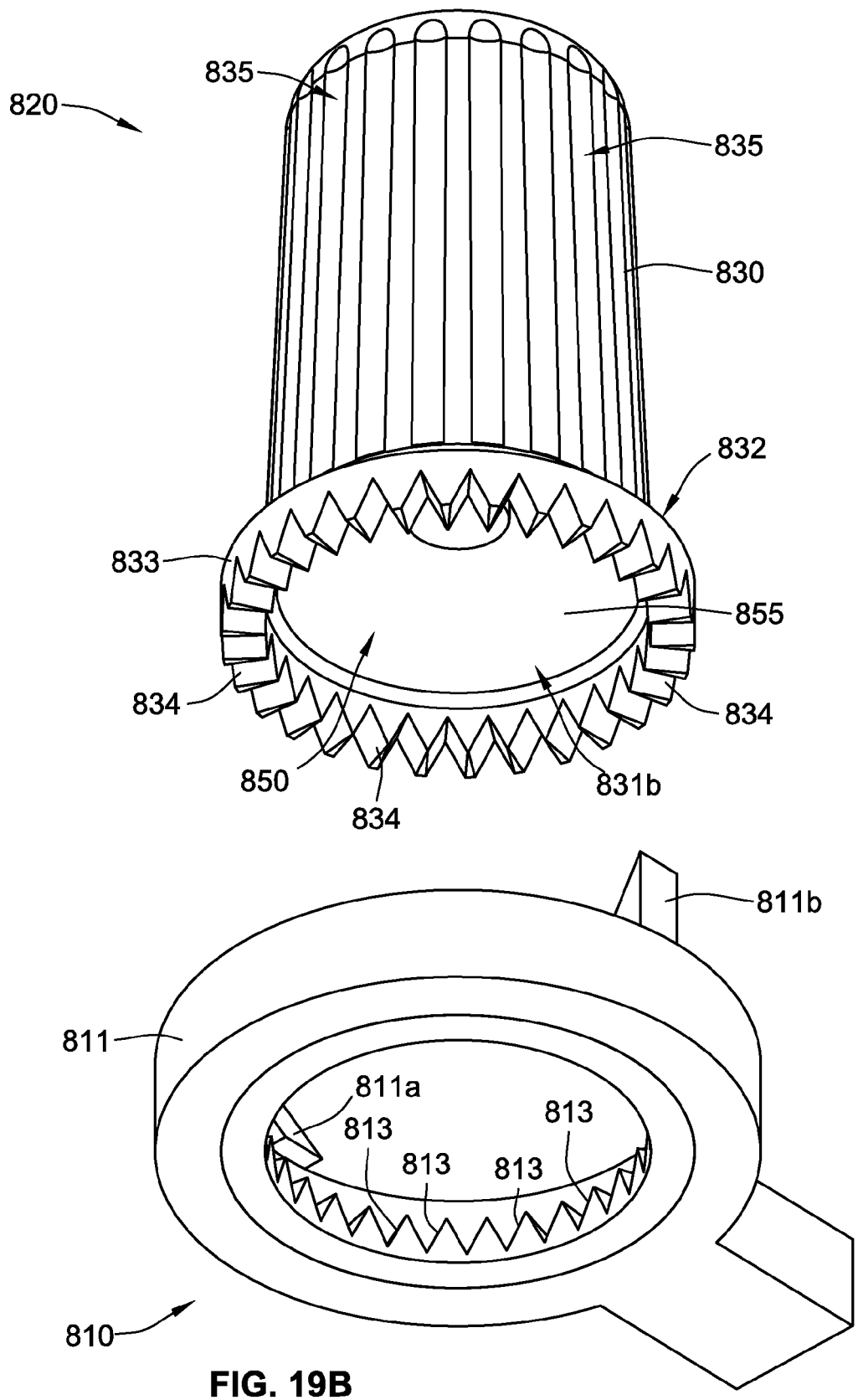
FIG. 19B is an assembled perspective view of the alternative compounding module and the alternative coupling mechanism of FIG. 19A.
Figure 19C:
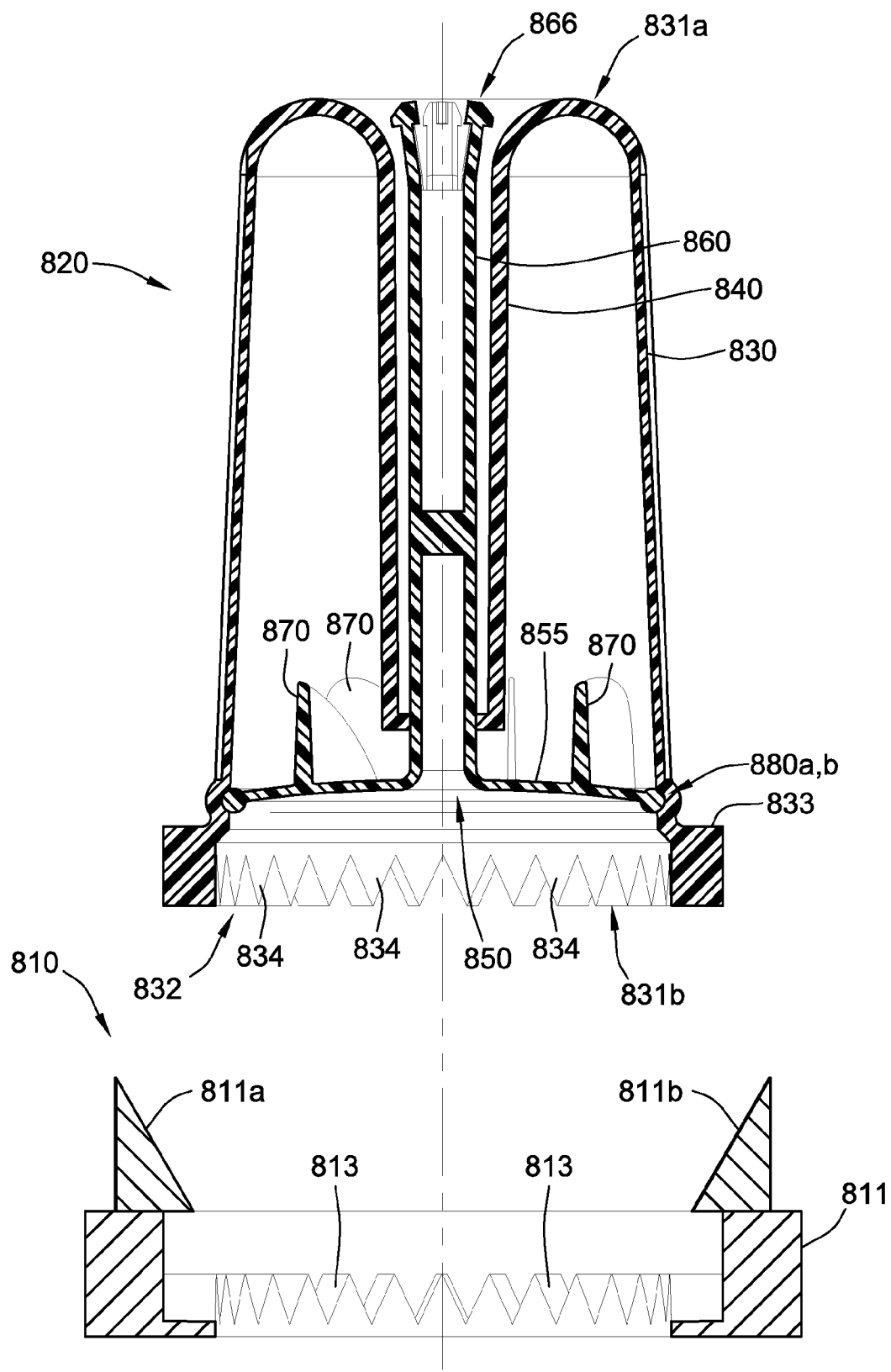
FIG. 19C is an assembled cross-sectional view of the alternative compounding module and the alternative coupling mechanism of FIG. 19A.
Figure 19D:
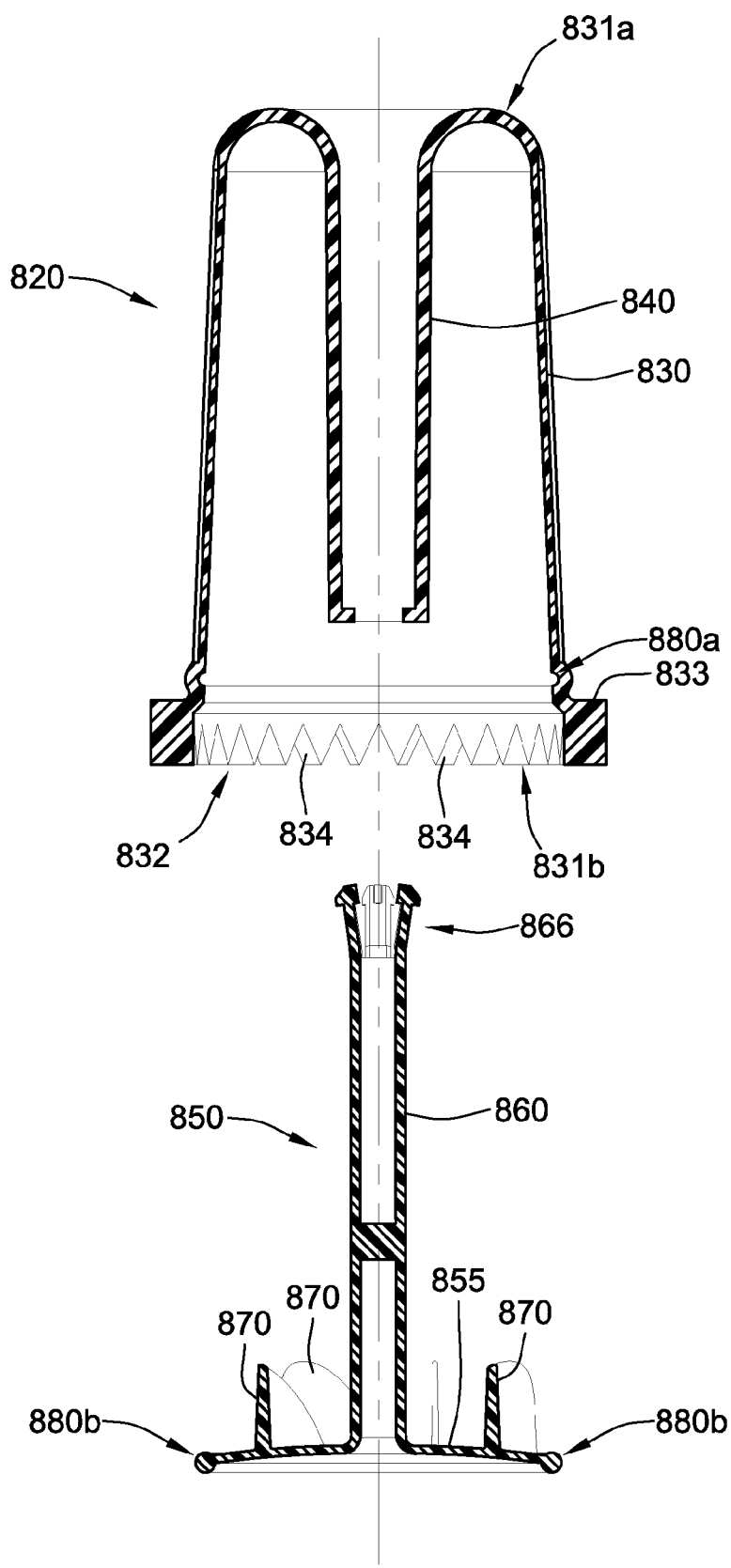
FIG. 19D is an exploded cross-sectional view of the alternative compounding module of FIG. 19A.

Another difference between the compounding module 820 and the compounding module 220 is that a sealing feature 880*a,b* (best shown in FIGS. 19C and 19D) of the compounding module 820 has a different configuration than the sealing feature 280*a,b*, as evident by a comparison of FIG. 7D (sealing feature 280*a,b*) with FIGS. 19C and 19D (sealing feature 880*a,b*).

Another difference between the compounding module 820 and the compounding module 220 is that the housing 830 includes a multitude of grooves 835 formed in an exterior surface of the housing 830 as compared to the generally flat exterior surface of the housing 230 of the compounding module 220. The grooves 835 can aid in adding rigidity to the housing 830 and/or aid in the automatic removal of a nutraceutical compound (not shown) contained within the housing 830, for example, when the agitator 850 is separated and lowered from the housing 830.

According to some implementations of the present disclosure, one or more protection sheets (e.g., burst foil, plastic sheet, etc.) can be attached to the first end and/or the second end of the compounding module (e.g., compounding module 120, 220, 520, 620, 720, 820) to aid in preventing contaminants from entering into one or more crevices of the compounding module prior to use in a beverage mixing system (e.g., beverage mixing system 100, 200). For example, a burst foil (not shown) can be coupled (e.g., via glue or tape) to the first end 831*a* of the compounding module 820 to prevent dirt or the like from entering the space between the bore 840 and the shaft 860, which is best shown in FIG. 19C.

It is expressly contemplated that any element or elements from any one or more of the claims enumerated herein can be combined with any other element or elements in any of the other claims to form a contemplated implementation of the present disclosure.

Each of the above implementations and obvious variations thereof is contemplated as falling within the spirit and scope of the claimed invention, which is set forth in the following claims.

What is claimed is:

1. A compounding module for use with a beverage mixing system, the compounding module comprising:
a housing defining an interior cavity and including a boss that extends from a first end of the housing into the interior cavity towards a second opposing end of the housing, the boss defining an inner bore, the housing including a coupler with a generally circular head that protrudes from the first end of the housing away from the interior cavity, the coupler to be engaged by a coupling mechanism of the beverage mixing system to prevent rotation and translation of the housing relative to the coupling mechanism of the beverage mixing system; and
an agitator including a base, a shaft, and a mixing element, the base of the agitator being affixed to the second end of the housing to seal the interior cavity, the shaft of the agitator extending from the base and being slidable relative to the inner bore of the boss such that the shaft and the mixing element of the agitator are movable between a first position and a second position, a portion of the shaft of the agitator to be engaged by a drive shaft of the beverage mixing system during operation of the beverage mixing system,
wherein when the drive shaft engages the shaft of the agitator, the boss of the housing in conjunction with the shaft of the agitator isolate the drive shaft from the interior cavity of the housing.

2. The compounding module of claim 1, wherein the shaft of the agitator includes a collet configured to engage a notch of the drive shaft of the beverage mixing system to lock the agitator to the drive shaft such that translation of the drive shaft results in corresponding translation of the agitator.

3. The compounding module of claim 2, wherein the notch is formed in an external surface of the drive shaft.

4. The compounding module of claim 1, wherein the shaft of the agitator has a protrusion that mates with a notch in the inner bore of the boss of the housing.

5. The compounding module of claim 4, wherein the protrusion and the notch form a mechanical seal for aiding in preventing contamination of the drive shaft.

6. The compounding module of claim 1, wherein the coupler includes a plurality of teeth configured to be engaged by the coupling mechanism of the beverage mixing system to prevent rotation of the housing relative to the coupling mechanism.

7. The compounding module of claim 1, wherein the boss and the shaft of the agitator isolate the drive shaft from the interior cavity of the housing when the agitator is in the first position and when the agitator is in the second position.

8. The compounding module of claim 1, wherein the base of the agitator is affixed to the second end of the housing via sonic welding.

9. A module for use with a system, the module comprising:
a housing defining an interior cavity and including a boss that extends from a first end of the housing into the interior cavity towards a second opposing end of the housing, the boss defining an inner bore; and
an agitator including a base, a shaft, and a mixing element, the shaft of the agitator extending from the base and being slidable relative to the inner bore of the boss such that the agitator is movable between a first position and a second position, a portion of the shaft of the agitator to be engaged by a drive shaft of the system during operation of the system.

10. The module of claim 9, wherein the shaft of the agitator includes a collet configured to engage a notch of the drive shaft of the system to lock the agitator to the drive shaft such that translation of the drive shaft results in corresponding translation of the agitator.

11. The module of claim 10, wherein the notch is formed in an external surface of the drive shaft.

12. The module of claim 9, wherein the base of the agitator is affixed to the second end of the housing to seal the interior cavity.

13. The module of claim 9, wherein the shaft of the agitator has a protrusion that mates with a notch in the inner bore of the boss of the housing.

14. The module of claim 13, wherein the protrusion and the notch form a mechanical seal for aiding in preventing contamination of the drive shaft.

15. The module of claim 9, wherein when the drive shaft engages the shaft of the agitator, the boss of the housing in conjunction with the shaft of the agitator isolate the drive shaft from the interior cavity of the housing.

16. The module of claim 9, further comprising a compound positioned within the interior cavity of the housing.

17. The module of claim 16, wherein in response to the agitator moving from the first position to the second position, at least a portion of the compound moving from the interior cavity of the housing to a vessel positioned below the module.

18. The module of claim 17, wherein when the drive shaft engages the shaft of the agitator, the boss of the housing in conjunction with the shaft of the agitator isolate the drive shaft from the at least a portion of the compound.

19. The module of claim 17, wherein the vessel includes a liquid therein.

20. The module of claim 17, wherein the first position is a sealed position and the second position is an unsealed position.

21. The module of claim 9, wherein the housing includes a coupler that protrudes from the first end of the housing away from the interior cavity, the coupler to be engaged by a coupling mechanism of the system.

22. The module of claim 21, wherein the coupler has a generally circular head.

23. The module of claim 21, wherein the coupler aids in preventing rotation of the housing relative to the coupling mechanism of the system.

24. The module of claim 21, wherein the coupler aids in preventing translation of the housing relative to the coupling mechanism of the system.

25. The module of claim 21, wherein the drive shaft of the system imparts a rotational motion to at least a portion of the module.

26. The module of claim 21, wherein the drive shaft of the system imparts a translational motion to at least a portion of the module.

27. The module of claim 21, wherein the coupler includes a plurality of teeth to be engaged by the coupling mechanism of the system to prevent rotation of the housing relative to the coupling mechanism.

28. The module of claim 9, further comprising a machine-readable tangible structure selected from the group consisting of a barcode, a QR code, an RFID tag, and an NFC chip for use by the system to authenticate the module.

29. The module of claim 28, wherein the machine-readable tangible structure is built into the housing.

30. The module of claim 28, wherein the machine-readable tangible structure includes the following information: contents of the module, mixing information, lot information, an expiration date, reorder information, manufacturer information, authentication information, or any combination thereof.

* * * * *